US012059912B2

(12) United States Patent
Li

(10) Patent No.: US 12,059,912 B2
(45) Date of Patent: Aug. 13, 2024

(54) ROTATING MECHANISM FOR STAMPING RING PATTERNS AND A STAMP TOOL THEREOF

(71) Applicant: Parric Ningbo Stationery and Gifts Mfg. Co., Ltd., Zhejiang (CN)

(72) Inventor: Fuping Li, Zhejiang (CN)

(73) Assignee: Parric Ningbo Stationery and Gifts Mfg. Co., Ltd., Ningbo (CN)

( * ) Notice: Subject to any disclaimer, the term of this patent is extended or adjusted under 35 U.S.C. 154(b) by 0 days.

(21) Appl. No.: 18/263,090

(22) PCT Filed: Mar. 16, 2022

(86) PCT No.: PCT/CN2022/081050
§ 371 (c)(1),
(2) Date: Jul. 26, 2023

(87) PCT Pub. No.: WO2023/130574
PCT Pub. Date: Jul. 13, 2023

(65) Prior Publication Data

US 2024/0123747 A1 Apr. 18, 2024

(30) Foreign Application Priority Data

Jan. 7, 2022 (CN) ......................... 202210016201.5

(51) Int. Cl.
*B41K 3/02* (2006.01)
*B41K 3/44* (2006.01)
*B41K 3/62* (2006.01)

(52) U.S. Cl.
CPC .................. *B41K 3/02* (2013.01); *B41K 3/44* (2013.01); *B41K 3/62* (2013.01)

(58) Field of Classification Search
CPC ........ B41J 29/13; B41J 2/17523; B41J 29/38; B41K 3/02; B41K 3/44; B41K 3/62
See application file for complete search history.

(56) References Cited

U.S. PATENT DOCUMENTS 4,070,967 A * 1/1978 Schlau ..................... B41K 3/04 101/301
10,960,696 B1 * 3/2021 Garza ...................... B41K 3/44
(Continued)

*Primary Examiner* — Christopher E Mahoney
*Assistant Examiner* — Marissa Ferguson-Samreth
(74) *Attorney, Agent, or Firm* — Wang Law Firm, Inc.

(57) ABSTRACT

The present invention relates to a rotating mechanism for annular pattern stamping and stamping machine thereof. The rotating mechanism comprises a base (4), a rotating unit (5) rotatably disposed on the base, an operating unit (6) detachably disposed on the rotating unit; wherein, a clamping space is defined between the rotating unit and the operating unit for clamping a stamping carrier; the operating unit is capable of rotating together with the rotating unit and the stamping carrier in the clamping space relative to the base. Compared with the manual mode, the rotating mechanism for annular pattern stamping of the present invention can realize the automatic rotation of the stamping carrier by the operating unit, so it is convenient to operate. In addition, the displacement of the stamping carrier in the stamping process can be avoided by the clamping and positioning of the operating unit and the rotating unit, so that the accuracy of the stamping position and the quality of the stamped pattern are ensured.

21 Claims, 18 Drawing Sheets

(56) References Cited

U.S. PATENT DOCUMENTS

| | | | | |
|---|---|---|---|---|
| 2019/0023059 | A1* | 1/2019 | McBride, Jr. | B43L 13/205 |
| 2019/0092062 | A1* | 3/2019 | Li | B41K 3/02 |
| 2021/0260900 | A1* | 8/2021 | Ericson | E05D 7/1072 |

* cited by examiner

ROTATING MECHANISM FOR STAMPING RING PATTERNS AND A STAMP TOOL THEREOF

TECHNICAL FIELD OF THE INVENTION

The present invention relates to the field of handicraft tools, particularly relates to the technical field of pattern stamping, and in particular to a rotating mechanism for annular pattern stamping and a stamping machine thereof.

BACKGROUND OF THE INVENTION

The stamping machine is a device that transfers the ink to a substrate through a graphic part by squeezing two plates. By using stamping machines, consumers can stamp their favorite patterns on paper, clothes or other stamping carriers. For example, a Chinese Patent CN109353135A (patent NO: CN201811045056.3) disclosed a stamping machine. The stamping machine comprises a body, wherein the body comprises a soleplate for placing a carrier and a stamp, a pressure plate that cooperates with the soleplate to press the carrier and the stamp, and a magnetic attraction mechanism that generates a mutual attraction force between the pressure plate and the soleplate, and the soleplate has an operating space for placing the carrier and the seal on an upper surface.

Compared with the conventional manual stamping mode, the stamping machine disclosed in the above patent is convenient to operate and can obtain a complete and uniform pattern. However, when a user needs to stamp an annular character and/or pattern on a stamping carrier, it is usually realized by manually rotating the stamping carrier. This method is trouble in operation and low in efficiency, and the stamping carrier is easy to move during the stamping process, so that the character or pattern cannot be accurately stamped at a desired position, and the annular pattern required by the user cannot be obtained.

SUMMARY OF THE INVENTION

It is a first object of the present invention to provide a rotating mechanism for annular pattern stamping which is convenient to use and good in stamping effect.

It is a second object of the present invention to provide a rotating mechanism for annular pattern stamping which is adjustable in rotation gear.

It is a third object of the present invention to provide a stamping machine with the rotating mechanism described above.

For achieving at least one of the objects, the rotating mechanism for annular pattern stamping comprises a base, a rotating unit disposed on the base, an operating unit detachably disposed on the rotating unit; wherein, a clamping space is defined between the rotating unit and the operating unit for clamping a stamping carrier; the operating unit is capable of rotating together with the rotating unit and the stamping carrier in the clamping space relative to the base.

Preferably, the rotating unit has a first clamping plane at the top thereof, and the operating unit has a second clamping plane at the bottom thereof; the first clamping plane is opposed to the second clamping plane, and the clamping space is defined between the first clamping plane and the second clamping plane. The stamping carrier is generally a planar article, such as paper, so that the clamping space defined by the upper and lower planes can better clamp the stamping carrier.

Preferably, both the first clamping plane and the second clamping plane are circular, matched in size and exactly opposed with each other; the operating unit and the rotating unit are capable of rotating circumferentially about the central axis common to the first clamping plane and the second clamping plane. Thus, the synchronous rotation of the operating unit, the rotating unit and the stamping carrier can be better realized.

Preferably, a plurality of first magnetic pieces are embedded in the first clamping plane of the rotating unit, and a plurality of second magnetic pieces are embedded in the second clamping plane of the operating unit, the operating unit is detachably attached to the rotating unit by the magnetic attraction between the plurality of first magnetic pieces and the plurality of second magnetic pieces. The rotating unit and the operating unit are detachably connected by the magnetic attraction, so it is convenient for disassembly, and it is convenient to load or unload the stamping carrier.

Preferably, the first clamping plane has two first magnetic pieces, and the second clamping plane has two second magnetic pieces each corresponding to one of the first magnetic pieces, and the two first magnetic pieces are opposite in magnetism, each first magnetic piece is capable of connecting magnetically with the corresponding second magnetic piece. Thus, the relative assembly positions of the operating unit and the rotating unit can be limited, and the both can be assembled more accurately.

Preferably, the two first magnetic pieces are symmetrically disposed around the center of the first clamping plane, so that the rotating unit and the rotating unit can be assembled stably on the basis of better limiting the relative positions of the operating unit and the rotating unit.

Preferably, a plurality of antiskid pads is disposed on top of the first clamping plane or the bottom of the second clamping plane. Thus, the relative friction force between each clamping plane and the stamping carrier is increased, and the stamping carrier can be better driven to rotate synchronously.

Preferably, the operating unit comprises a cylindrical operating knob, a bottom surface of the operating knob is defined as the second clamping plane, the operating knob has an observation channel penetrating through the operating knob along a central axis of the operating knob, and an alignment mechanism is disposed inside the observation channel, so that the selected point of the stamping carrier can be aligned by the alignment mechanism.

Preferably, the alignment mechanism comprises a cross-shaped alignment frame centered on the central axis of the operating knob. The selected position of the stamping carrier can be positioned by the alignment mechanism, so that the pattern can be stamped at a correct position.

Preferably, the rotary mechanism further comprises a rotation gear unit being capable of making the rotating unit to rotate circumferentially relative to the base at a preset angle. Thus, the user can obtain annular patterns with a specific angular interval.

Preferably, the rotation gear unit comprises a gear marble, a plurality of gear recesses for receiving the gear marble and a gear spring; the rotating unit comprises a disc-shaped rotating tray and a gear ring surface centered on a central axis of the rotating tray; the plurality of gear recesses are distributed on the gear ring surface at regular intervals, and the position between two adjacent gear recesses on the gear ring surface forms a plurality of gear teeth; when the operating unit rotates, the gear marble is driven to slide circumferentially relative to the gear ring surface, and when the gear marble slides into one of the gear recesses on the gear ring surface, the gear marble is clamped inside the gear recess by the gear spring. Thus, when the gear marble slides into a next gear recess, the gear marble can slide into this gear recess under the action of an elastic force of the gear spring. The included angle between adjacent gear recesses which is also the included angle between repeated patterns in the stamped annular pattern; and, when the gear marble is clamped into this gear recess, the rotating tray stops rotating, and the stamp stamps a pattern on the stamping carrier. As the gear marble is slidable on the gear ring surface, the stamp stamps repetitively to form the annular pattern.

Preferably, the base has a circular mounting recess, the rotating tray is located inside the mounting recess and is rotatable circumferentially relative to the base; the gear ring surface is located on the periphery of the rotating tray, the base has a first mounting tunnel for receiving the gear marble, the first mounting hole extends to the mounting recess and opens toward the mounting recess, the gear marble is located inside the first mounting tunnel and is movable along the first mounting tunnel, the gear spring is limited between the gear marble and an end of the first mounting tunnel. On one hand, the gear marble can be mounted stably; on the other hand, it is advantageous for the gear marble to be slidable on the gear ring surface and successively slide into each gear recess.

Preferably, the rotation gear unit comprises a gear marble, a plurality of gear recesses for allowing the gear marble to be clamped therein, and a gear spring; the rotating unit comprises a disc-shaped rotating tray; the gear marble is disposed on the periphery of the rotating tray; the base comprises a circular mounting port, the rotating tray is embedded in the circular mounting port and can rotate circumferentially in the circular mounting port relative to the base, a mounting space communicated with the mounting port is disposed below the rotating tray, the gear recesses are located on the bottom surface of the rotating tray, the gear recesses are located circumferentially at regular intervals centered on a bottom surface of the rotating tray to form gear rings, the gear marble and the gear spring are both disposed in the mounting space, the gear marble is exactly opposed to the gear rings, and the gear spring urges the gear marble toward the gear rings.

Preferably, the rotation gear unit further comprises a gear arm horizontally arranged in the mounting space; a second mounting hole extending vertically is formed on the top surface of the gear arm; the gear marble is embedded in the second mounting hole and can move in a depth direction of the second mounting hole; and, the gear spring is limited between the gear marble and an inner bottom surface of the second mounting hole. The gear marble moves along the gear rings. When the gear marble is clamped into a gear recess, the rotating tray stops rotating and the stamp stamps a pattern on the stamping carrier. When the gear marble resists against a gear convex surface, the gear spring is compressed and urges the gear marble to move upwards. Thus, when the gear marble slides into a next gear recess, the gear marble can be clamped into this gear recess under the action of the elastic force of the gear spring.

Preferably, at least two concentric gear rings are located on the bottom surface of the rotating tray, the gear recesses are disposed on perimeters of the gear rings at uniform intervals, the number of the gear recesses on each gear ring scales directly with the circumferential length of the gear ring, the gear arm is capable of moving horizontally in the mounting space to allow the gear marble to vertically urge against the corresponding gear ring. Thus, the gear marble faces different gear rings by moving the gear arm, so that the included angle between adjacent repeated patterns in the stamped annular pattern can be changed.

Preferably, a gear column is vertically arranged in the mounting space; the gear arm is in a long strip shape, and a first end of the gear arm is pivoted to the gear column; during the rotation of the gear arm about the gear column, the gear marble can move back and forth between different gear rings, so that the rotation of the gear arm can be realized, and the gear marble can be adjusted to face the corresponding gear ring as required so as to obtain an annular pattern at the desired included angle.

Preferably, there are two pairs of limiting columns vertically disposed in the mounting space, the two pairs of limiting columns are disposed on two sides of the gear arm, respectively, when the gear arm is resisted against one pair of limiting columns, the gear marble is urged against the gear ring with the shortest circumference, and, when the gear arm is resisted against the other pair of limiting columns, the gear marble is urged against the gear ring with the longest circumference. Thus, the act of the gear arm can be limited, and the situation where the gear marble slides out the gear rings during the gear shifting process and cannot slide between different gear rings is avoided. In addition, each limiting column can support the rotating tray, so that the rotating tray can rotate about the rotating column described below more stably.

Preferably, a rotating column is also vertically arranged in the mounting space, and a rotating shaft sleeve vertically extending downward is disposed on a center of a bottom surface of the rotating tray. The rotating shaft sleeve is connected to the rotating column and can rotate around the rotating column, so that the rotating tray can rotate more stably.

Preferably, the second mounting hole is disposed on a middle portion of the gear arm, the gear column is located on one side of the rotating column, and the middle portion of the gear arm is bent toward one side in the horizontal direction to form an avoidance groove for allowing the rotating column to clamped therein; each pair of limiting columns has a first vertical column and a second vertical column, the two first vertical columns are disposed on two sides of the first end of the gear arm, respectively; and the two second vertical columns are disposed on two sides of a second end of the gear arm, respectively. Thus, the rotation of the gear arm can be better limited, the movement of the gear marble between different gear rings can be better limited, and the accuracy of gear shifting can be ensured.

Preferably, a limiting ring surface corresponding to a rotation trajectory of the gear arm is arranged in the mounting space, the limiting ring surface comprises a plurality of limiting grooves corresponding to the gear rings, an elastic limiting bump is convexly disposed at the second end of the gear arm, and the elastic limiting bump can slide long the limiting ring surface and can be clamped into each limiting groove. On one hand, the gear arm can be limited at a desired gear through the connection between the elastic limiting bump and the corresponding limiting groove; on the other hand, it is convenient for the user to perform a gear shifting operation by the gear arm.

Preferably, the base is of a hollow structure having an inner cavity which forms the mounting space, and the mounting port is formed on its top wall of the base; the gear column, the limiting columns and the limiting grooves are formed on an inner bottom surface of the base, respectively, and an operating port is formed on the sidewall of the base; and, an end portion of the second end of the gear arm is exposed from the operating port and forms an operating end for hand operation. Thus, the inner structure of the base can be simpler, and it can be more convenient for the user to perform the gear shifting operation.

For achieving the third object, the stamping machine comprises a soleplate and a cover plate arranged above the soleplate, wherein the stamping machine has the rotary mechanism for annular pattern stamping.

Preferably, the rotary mechanism is integrated with or detachably connected to the soleplate. The integrated structure of the stamping machine can realize a stable structure of the rotary mechanism and the soleplate, while the detachable connection can realize the connection of the rotary mechanism to different types of soleplates to satisfy the user's requirements.

Compared with the prior art, the present invention has the following advantages. A clamping space is defined between the rotating unit and the operating unit. Since the rotating unit is detachably connected to the operating unit, it is convenient to place a stamping carrier in the clamping space. In addition, in a state where the operating unit rotates, the operating unit, the rotating unit and the stamping carrier in the clamping space can synchronously rotate relative to the base, that is, the rotation of the stamping carrier can be realized by rotating the operating unit, so that the desired annular pattern is repeatedly stamped and formed on the stamping carrier. Compared with the manual mode, the rotating mechanism for annular pattern stamping of the present invention can realize the automatic rotation of the stamping carrier by the operating unit, so it is convenient to operate. In addition, the displacement of the stamping carrier in the stamping process can be avoided by the clamping and positioning of the operating unit and the rotating unit, so that the accuracy of the stamping position and the quality of the stamped pattern are ensured.

DETAILED DESCRIPTION OF THE INVENTION

Figure 1:
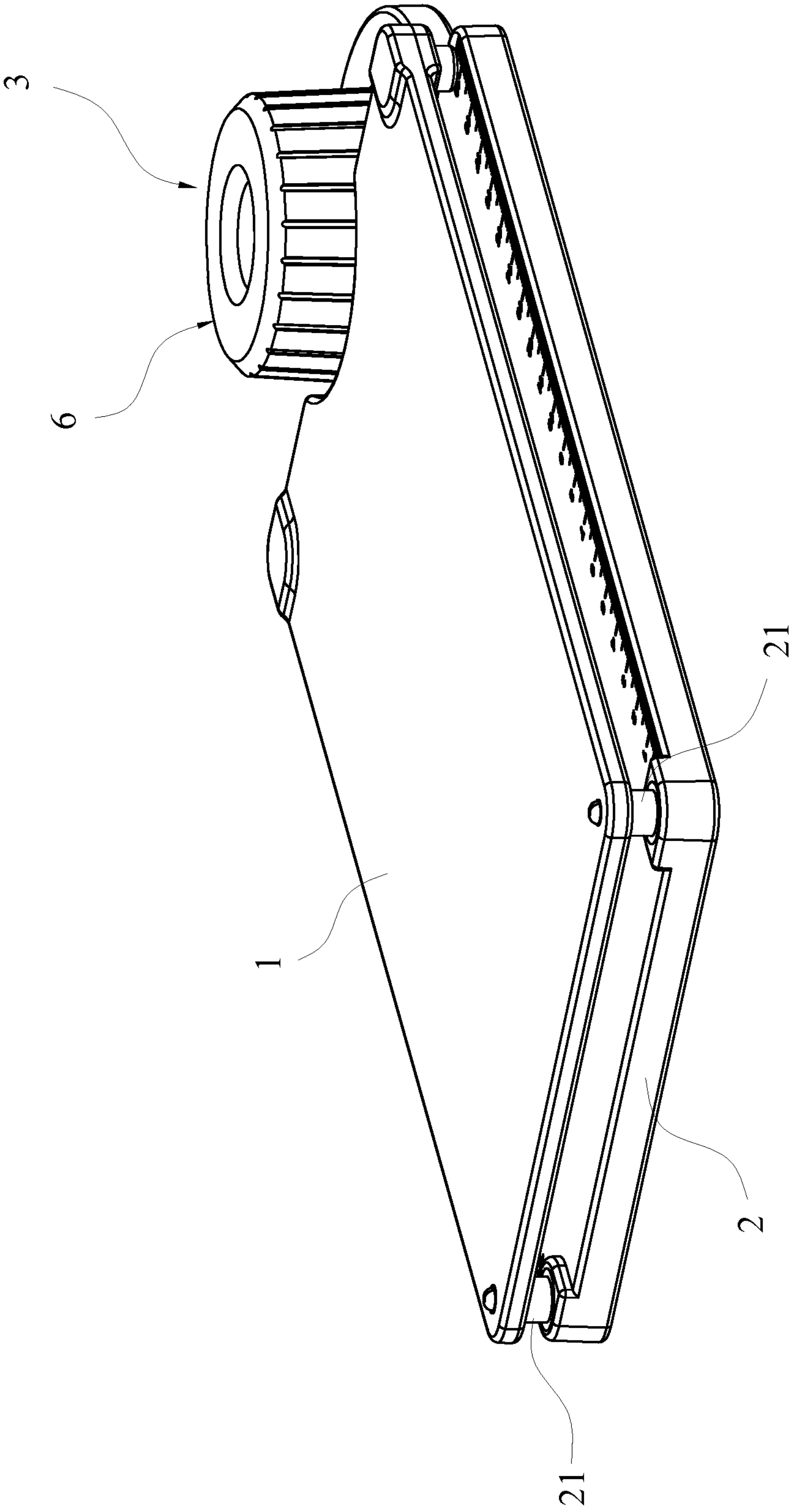
FIG. 1 is a perspective view of a stamping machine according to Embodiment 1 of the present invention.
Figure 2:
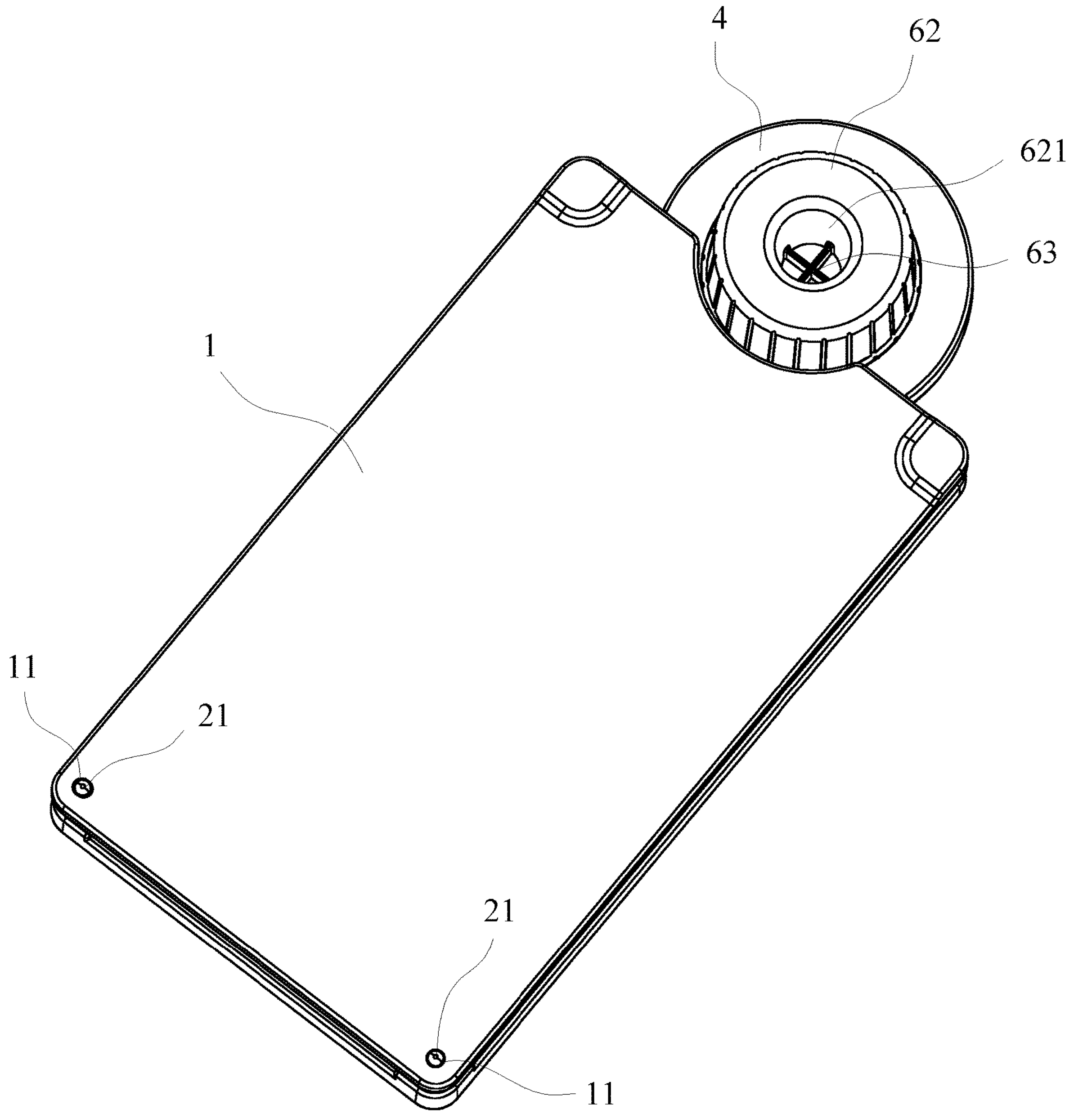
FIG. 2 is another perspective view of the FIG. 1.
Figure 3:
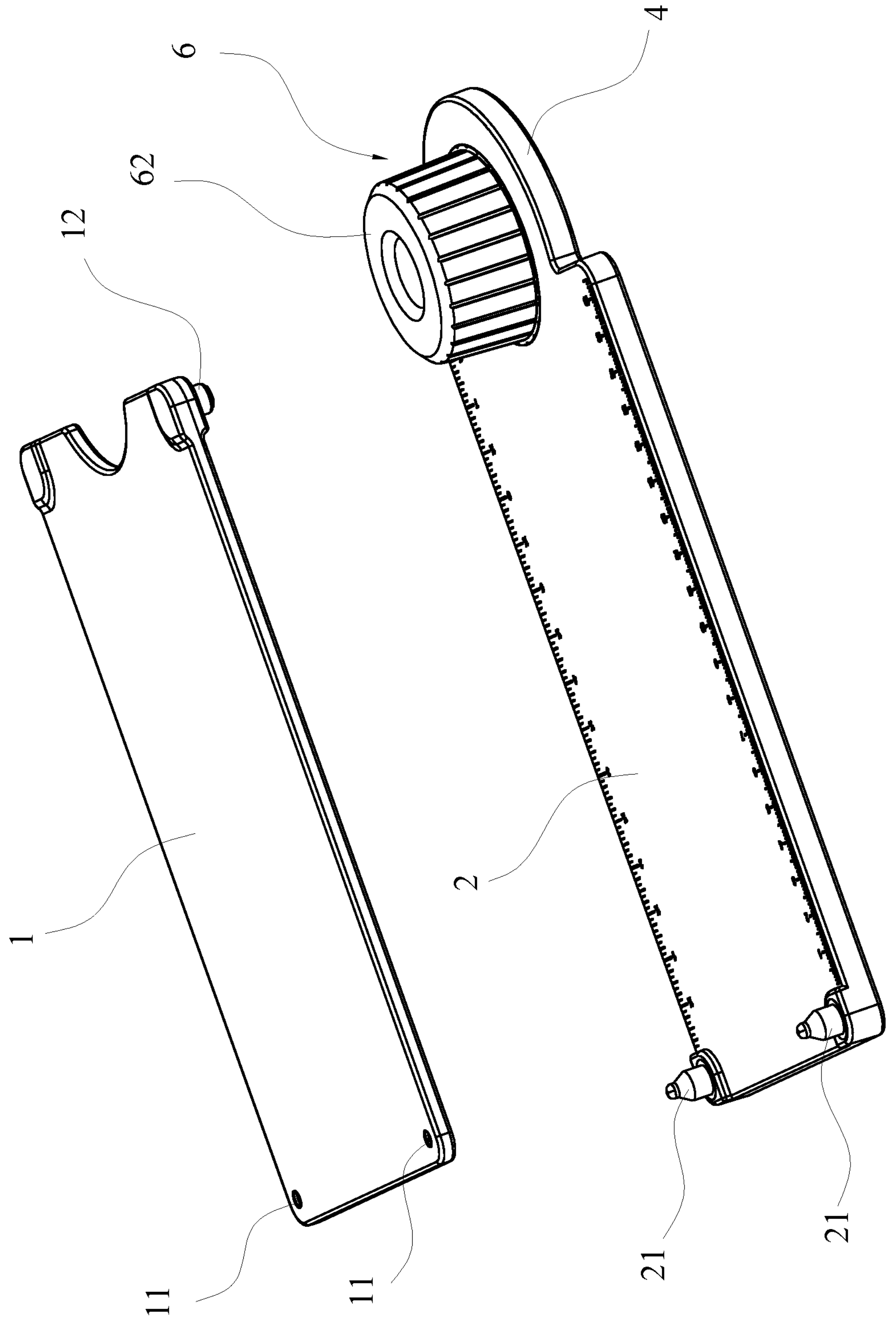
FIG. 3 is an exploded view of the stamping machine according to Embodiment 1 of the present invention.
Figure 4:
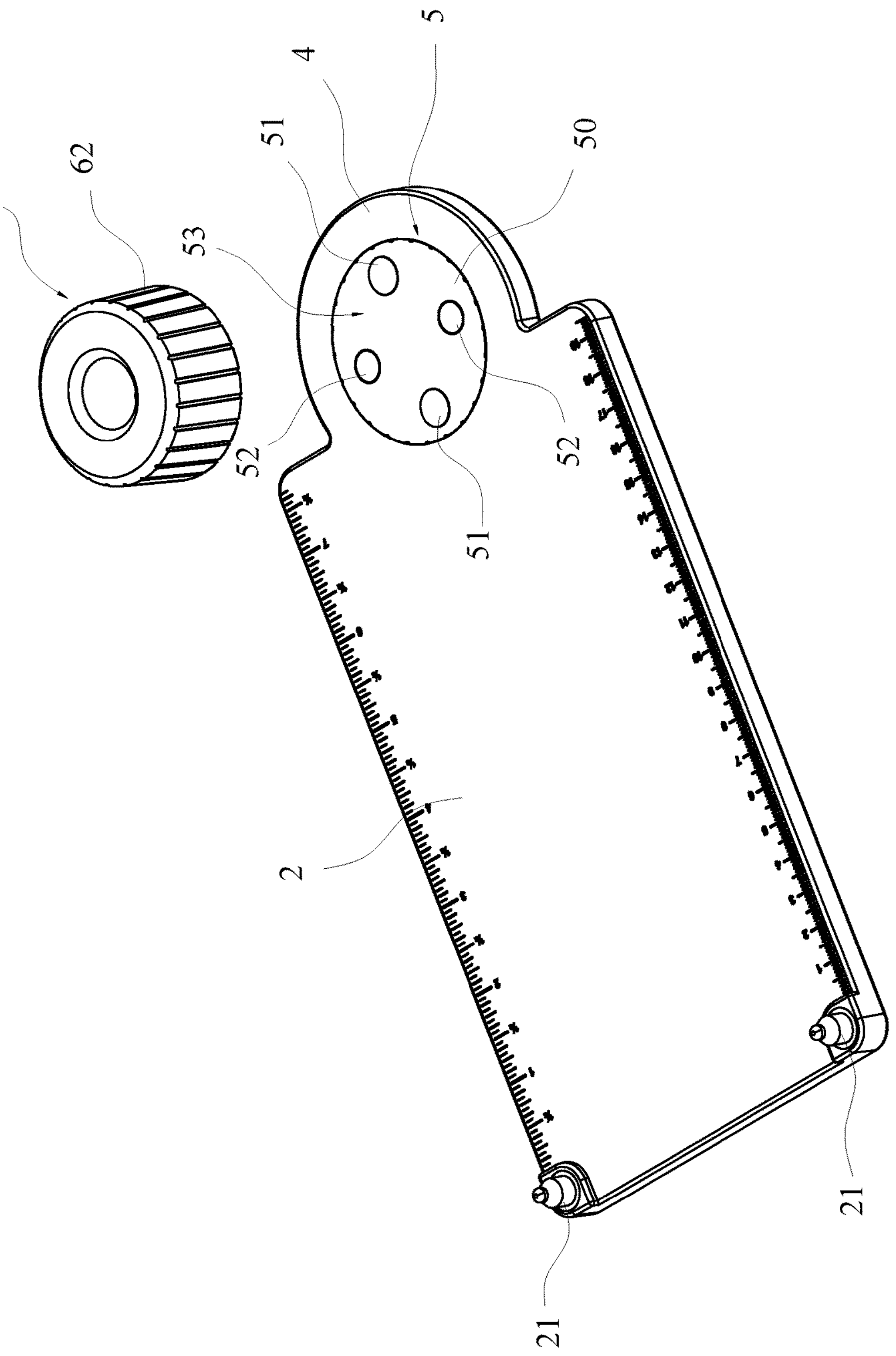
FIG. 4 is an exploded view of a soleplate according to Embodiment 1 of the present invention.
Figure 5:
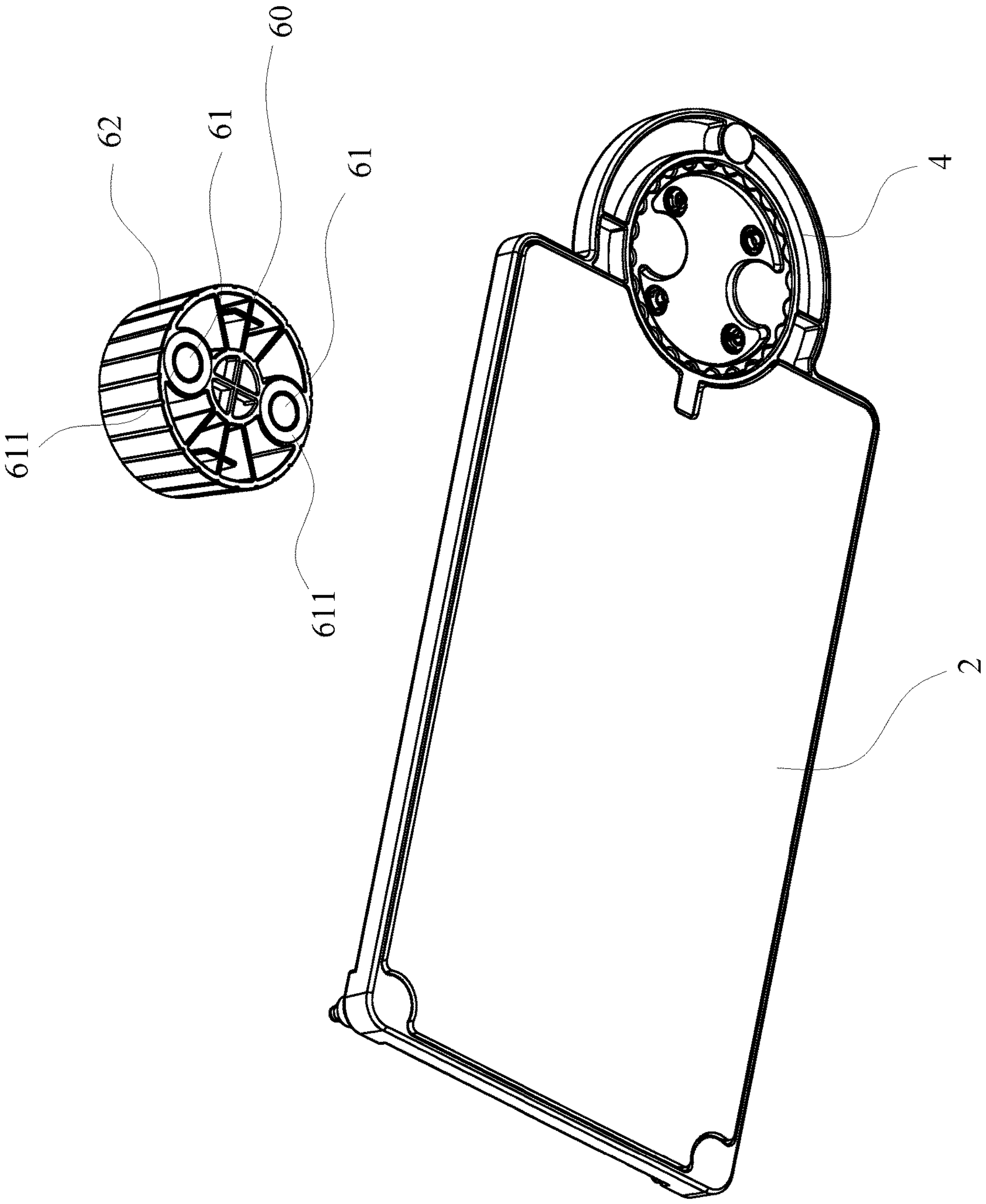
FIG. 5 is another exploded view of the FIG. 4.
Figure 6:
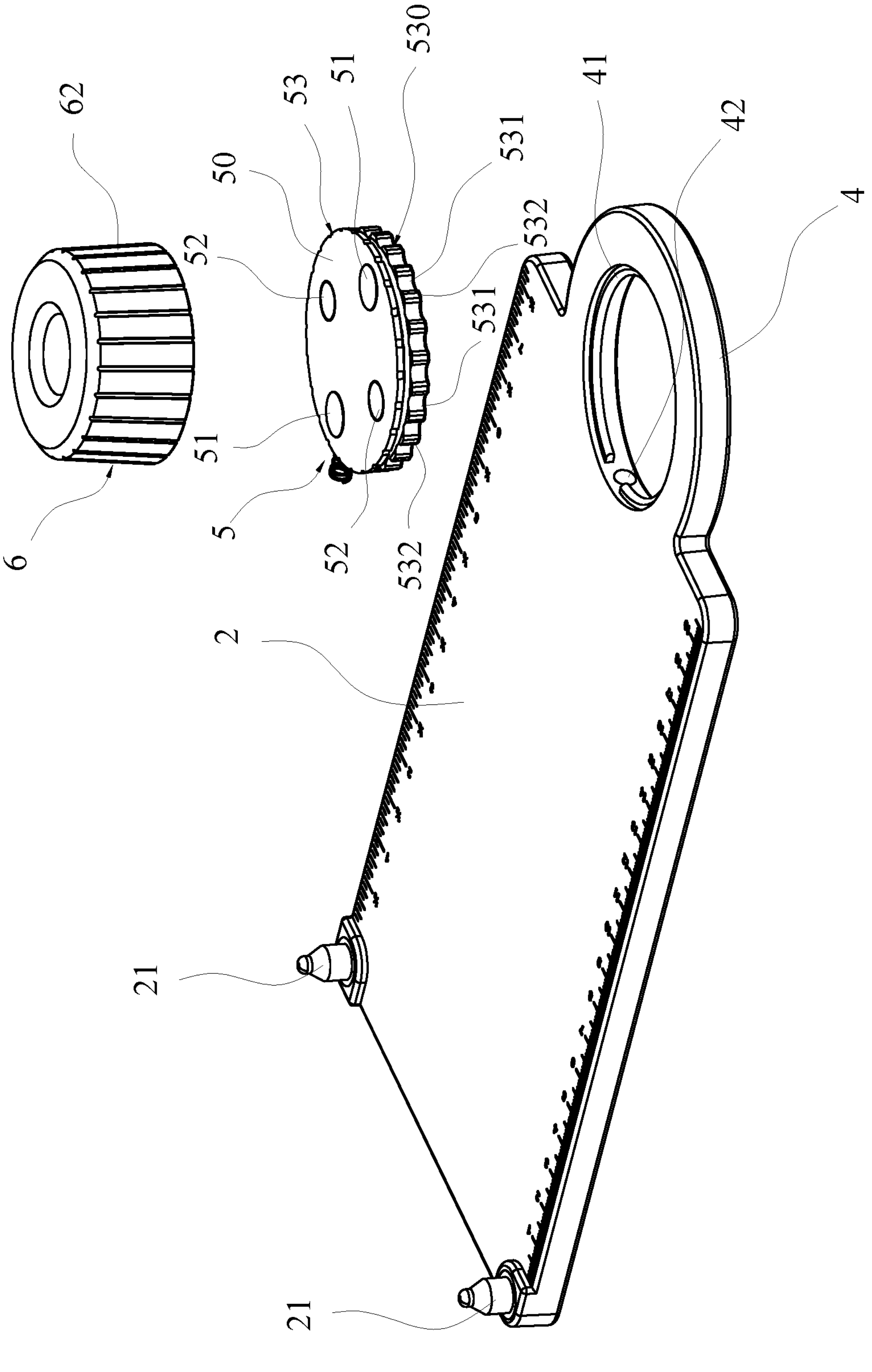
FIG. 6 is another exploded view of the soleplate according to Embodiment 1 of the present invention.
Figure 7:
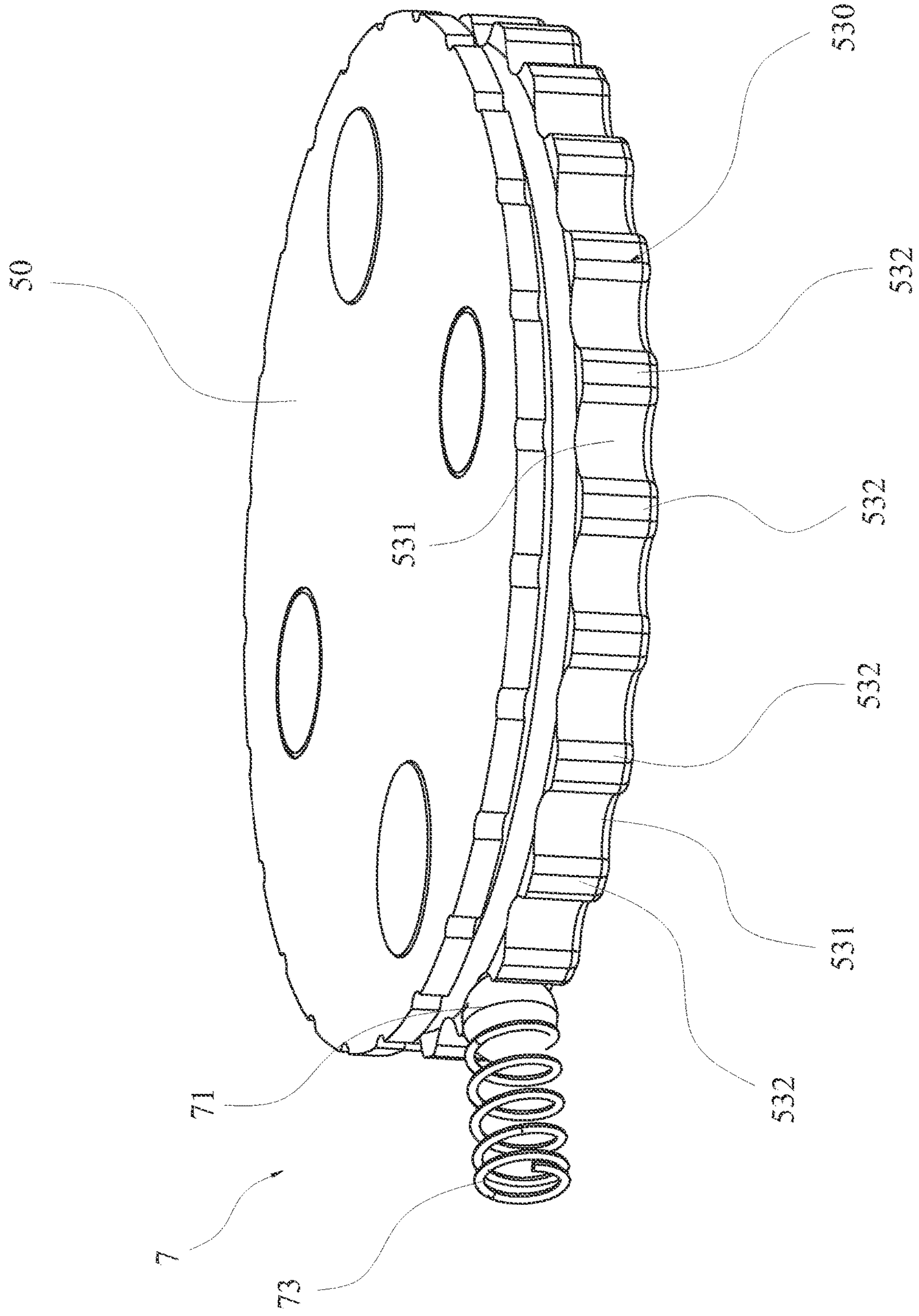
FIG. 7 is a perspective view of a rotating tray according to Embodiment 1 of the present invention.
Figure 8:
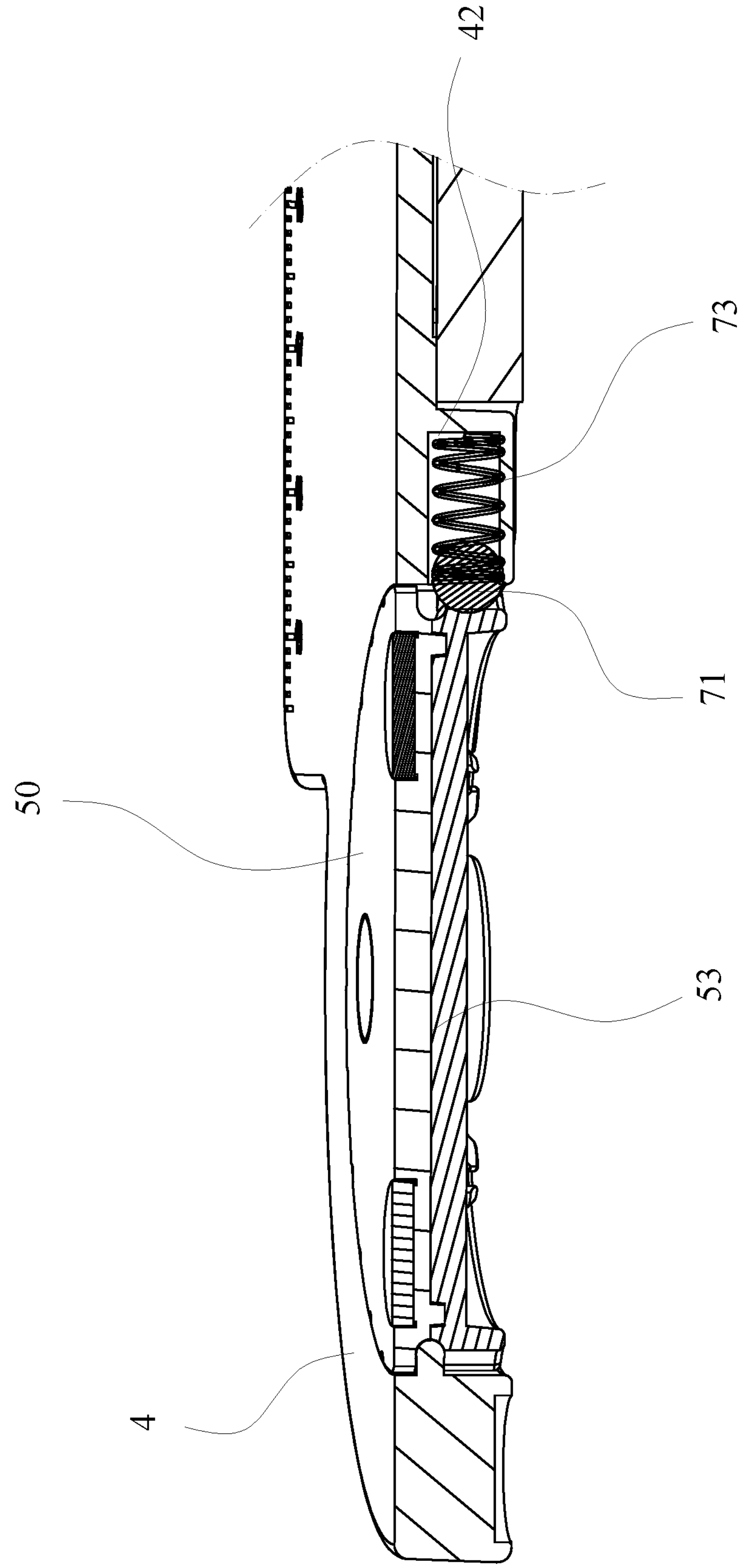
FIG. 8 is a partially sectional view of the soleplate according to Embodiment 1 of the present invention.

The present invention will be further described below in detail by embodiments with reference to the accompanying drawings.

Embodiment 1

FIGS. 1-8 show a first preferred embodiment of the stamping machine for annular pattern stamping of the present invention. The stamping machine comprises a soleplate 2 and a cover plate 1 arranged above the soleplate 2. A stamp (which is generally made of silicone or rubber and has characters and/or patterns on its one side) and a stamping carrier (which is a piece of paper in this embodiment) are clamped between the cover plate 1 and the soleplate 2. In this embodiment, both the cover plate 1 and the soleplate 2 are square, and the rotary mechanism 3 is disposed at one end of the soleplate 2.

Further, the rotary mechanism 3 comprises a base 4, a rotating unit 5 rotatably disposed on the base 4 and an operating unit 6 detachably disposed on the rotating unit 5; wherein, a clamping space is defined between the rotating unit 5 and the operating unit 6 for clamping a stamping carrier; the operating unit 6 is capable of rotating together with the rotating unit 5 and the stamping carrier in the clamping space relative to the base 4. In this embodiment, the base 4 is integrated with the soleplate 2, that is, one end of the soleplate 2 extends outward to form a semicircle which is defined as the base 4. The clamping space is used for clamping the stamping carrier.

It can be seen that the clamping space is defined between the rotating unit 5 and the operating unit 6. Since the rotating unit 5 is detachably connected to the operating unit 6, it is convenient to place the stamping carrier in the clamping space. In addition, in a state where the operating unit 6 rotates, the operating unit 6, the rotating unit 5 and the stamping carrier in the clamping space can synchronously rotate relative to the base 4, that is, the rotation of the stamping carrier can be realized by rotating the operating unit 6, so that the desired annular pattern is repeatedly stamped and formed on the stamping carrier. Compared with the manual mode, the rotating mechanism for annular pattern stamping of the present invention can realize the automatic rotation of the stamping carrier by the operating unit 6, so it is convenient to operate. In addition, the displacement of the stamping carrier in the stamping process can be avoided by the clamping and positioning of the operating unit 6 and the rotating unit 5, so that the accuracy of the stamping position and the quality of the stamped pattern are ensured.

Further, the rotating unit 5 has a first clamping plane 50 at the top thereof, and the operating unit 6 has a second clamping plane 60 at the bottom thereof; the first clamping plane 50 is opposed to the second clamping plane 60, and the clamping space is defined between the first clamping plane 50 and the second clamping plane 60. The stamping carrier is generally a planar article, such as paper, so that the clamping space defined by the upper and lower planes can better clamp the stamping carrier. Preferably, the first clamping plane 50 and the second clamping plane 60 are both circular, matched in size and exactly opposed with each other; the operating unit 6 and the rotating unit 5 are capable of rotating circumferentially around a central axis common to the first clamping plane 50 and the second clamping plane 60. Thus, the synchronous rotation of the operating unit 6, the rotating unit 5 and the stamping carrier can be better realized.

The detachable connection of the rotating unit 5 and the operating unit 6 is specifically implemented in various ways. In this embodiment, a plurality of first magnetic pieces 51 are embedded in the first clamping plane 50 of the rotating unit 5, the surface exposed of the first magnetic pieces 51 is flush with or approximately flush with the first magnetic pieces 51; and a plurality of second magnetic pieces 61 are embedded in the second clamping plane 60 of the operating unit 6, the surface exposed of second clamping plane 60 is flush with or approximately flush with the second magnetic pieces 60. The operating unit 6 is detachably attached to the rotating unit 5 by the magnetic attraction between the plurality of first magnetic pieces 51 and the plurality of second magnetic pieces 61. The rotating unit 5 and the operating unit 6 are detachably connected by the magnetic attraction, so it is convenient for disassembly, and it is convenient to load or unload the stamping carrier. Specifically, the first clamping plane 50 has two first magnetic pieces 51, and the two first magnetic pieces 51 are symmetrically disposed around the center of the first clamping plane 50. The second clamping plane 60 has two second magnetic pieces 61 each corresponding to one of the first magnetic pieces 51, and the two second magnetic pieces 61 are symmetrically disposed around the center of the second clamping plane 60, and the two first magnetic pieces 51 are opposite in magnetism, each first magnetic piece 51 is capable of connecting magnetically with the corresponding second magnetic piece 61. Thus, the corresponding assembly positions of the operating unit 6 and the rotating unit 5 can be limited, and the both can be assembled more accurately. In this embodiment, each first magnetic piece 51 and each second magnetic piece 61 are magnets. Of course, one of each first magnetic piece 51 and each second magnetic piece 61 may be a magnet, while the other thereof is a metal plate.

Further, a plurality of antiskid pads 52 is disposed on top of the first clamping plane 50 or the bottom of the second clamping plane 60. Thus, by arranging the antiskid pads 52, the friction force between each clamping plane and the stamping carrier is increased, and the stamping carrier can be better driven to rotate synchronously. In this embodiment, the antiskid pads 52 are arranged on the first clamping plane 50, and the two antiskid pads 52 which are circumferentially spaced from the two first magnetic pieces 51. Preferably, the second magnetic pieces 61 have antiskid gaskets 611 arranged on the bottom of the second magnetic pieces 61.

Specifically, the operating unit 6 comprises a cylindrical operating knob 62, a bottom surface of the operating knob 62 is defined as the second clamping plane 60, the operating knob 62 has an observation channel 621 penetrating through the operating knob 62 along a central axis of the operating knob 62, and an alignment mechanism is disposed inside the observation channel 621. In this embodiment, the alignment mechanism comprises a cross-shaped alignment frame 63 centered on the central axis of the operating knob 62. The selected position of the stamping carrier can be positioned by the alignment frame 63, so that the pattern can be stamped at the correct position.

To enable the user to obtain annular patterns at a specific angular interval, the rotating mechanism also comprises a rotation gear unit 7 which enables the rotating unit 5 to rotate circumferentially relative to the base 4 at a preset angle. In this embodiment, the rotation gear unit 7 comprises a gear marble 71, a plurality of gear recesses 531 for receiving the gear marble 71 and a gear spring 73; the rotating unit 5 comprises a disc-shaped rotating tray 53 and a gear ring surface 530 centered on a central axis of the rotating tray 53; the plurality of gear recesses 531 are distributed on the gear ring surface 530 at regular intervals, and the position between two adjacent gear recesses 531 on the gear ring surface 530 forms a plurality of gear teeth 532; when the operating unit 6 rotates, the gear marble 71 is driven to slide circumferentially relative to the gear ring surface 530, and when the gear marble 71 slides into one of the gear recesses 531 on the gear ring surface 530, the gear marble 71 is clamped inside the gear recess 531 by the gear spring 73. Thus, when the gear marble slides into a next gear recess, the gear marble can slide into this gear recess under the action of an elastic force of the gear spring. The included angle between adjacent gear recesses which is also the included angle between repeated patterns in the stamped annular pattern; and, when the gear marble is clamped into this gear recess, the rotating tray stops rotating, and the stamp stamps a pattern on the stamping carrier. As the gear marble is slidable on the gear ring surface, the stamp stamps repetitively to form the annular pattern.

In this embodiment, the included angle between adjacent gear recesses 531 is 15° (that is, an annular patter with an included angle of 15° can be obtained), and annular patterns with an included angle of 2×15°, 3×15°, 4×15°, 5×15°, 6×15°, etc. can be obtained by controlling the sliding distance of the gear marble 71 along the gear ring surface 530, respectively.

Further, the base 4 has a circular mounting recess 41, the rotating tray 53 is located inside the mounting recess 41 and is rotatable circumferentially relative to the base 4; the gear ring surface 530 is located on the periphery of the rotating tray 53, the base 4 has a first mounting tunnel 42 for receiving the gear marble 71, the first mounting hole 42 extends to the mounting recess 41 and opens toward the mounting recess 41, the gear marble 71 is located inside the first mounting tunnel 42 and is movable along the first mounting tunnel 42, the gear spring 73 is limited between the gear marble 71 and an end of the first mounting tunnel 42. On one hand, the gear marble 71 can be mounted stably; on the other hand, it is advantageous for the gear marble 71 to be slidable along the gear ring surface 530 and successively slide into each gear recess 531.

In addition, in this embodiment, the cover plate 1 away from the rotary mechanism 3 have positioning holes 11 formed on two sides of one end of the cover plate 1, respectively, and the soleplate 2 comprises a plurality of first elastic positioning columns 21, the first elastic positioning columns 21 can be inserted into the each corresponding positioning hole 11, respectively; and, in a state where the cover plate 1 is pressed down, each first elastic positioning column 21 is compressed and drives the cover plate 1 to move up. Meanwhile, the cover plate 1 comprises a plurality of second elastic positioning columns 12 on two sides of the bottom surface of the other end of the cover plate 1, respectively; and, in a state where the cover plate 1 is pressed down, each second elastic positioning column 12 also drives the cover plate 1 to move up.

During the stamping process, the stamping carrier is firstly placed on the upper surface of the soleplate 2, and one end of the stamping carrier is clamped in the clamping space. The stamp is placed at a position where stamping needs to be performed, the cover plate 1 is covered, positioned and then pressed down, each elastic positioning column is compressed, and the stamp attaches the lower surface of the cover plate 1. When the pressure applied to the cover plate 1 is removed, the cover plate 1 is reset upward under the action of the elastic force of each elastic positioning column, the cover plate 1 is taken up, and the desired ink is coated on the stamp. The cover plate 1 is covered again, positioned and pressed, each elastic positioning column is compressed, and the pattern on the stamp is uniformly stamped on the stamping carrier. By rotating the operating unit 6, the rotating unit 5 and the stamping carrier rotate synchronously with the operating unit 6. When rotating to a desired position, the operating unit 6 stops rotating, and the cover plate 1 is pressed down, and the pattern on the stamp is stamped on the stamping carrier again. The above operations are repeated by 360° to obtain the annular pattern required by the user.

Embodiment 2

Figure 9:
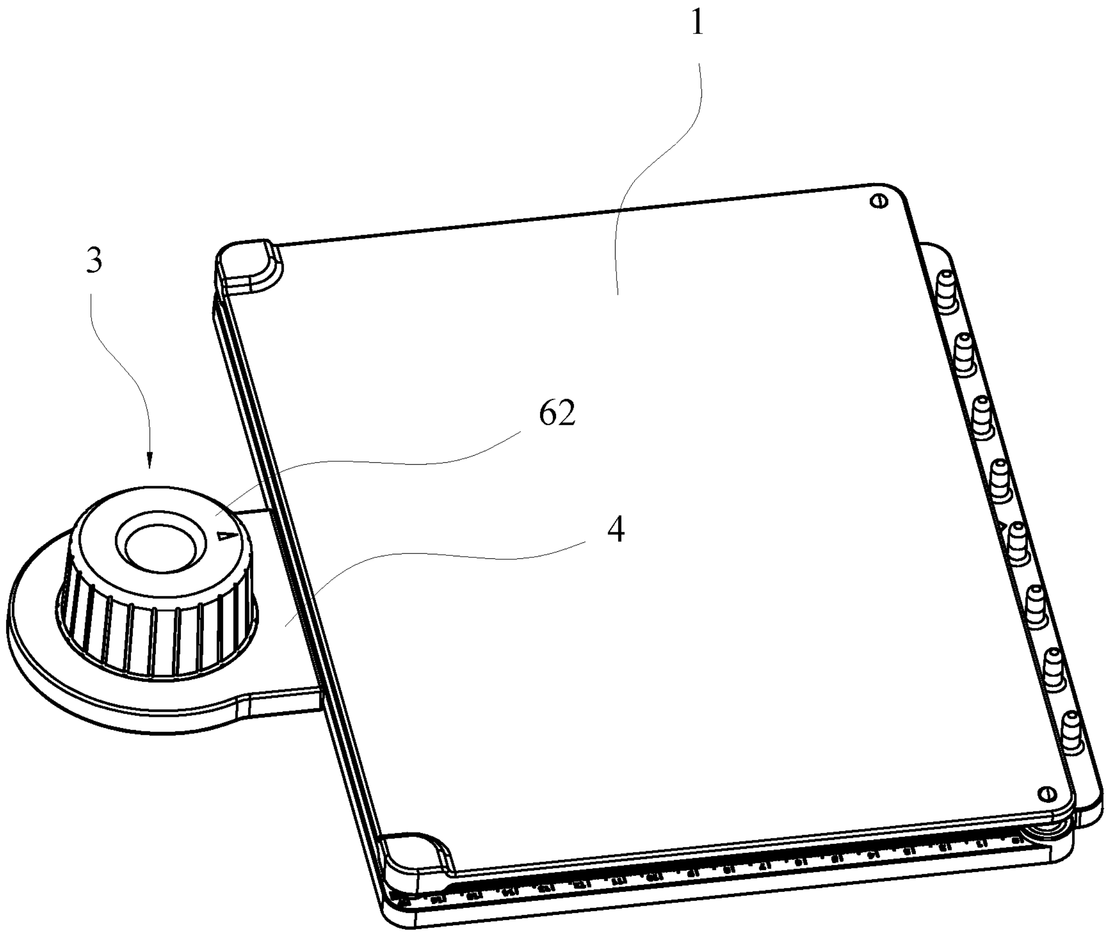
FIG. 9 is a perspective view of a stamping machine according to Embodiment 2 of the present invention.
Figure 10:
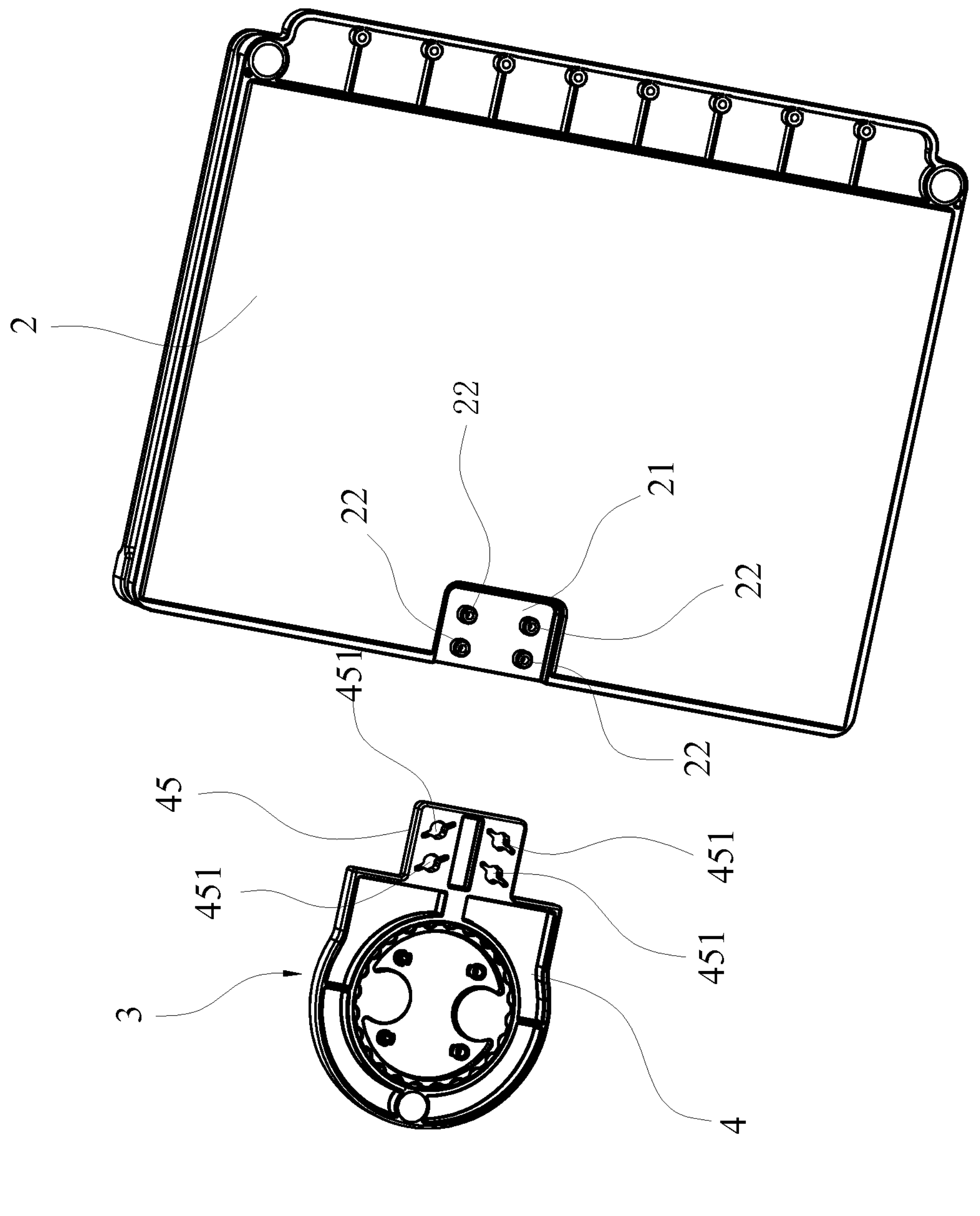
FIG. 10 is an exploded view of the stamping machine according to Embodiment 2 of the present invention.
Figure 11:
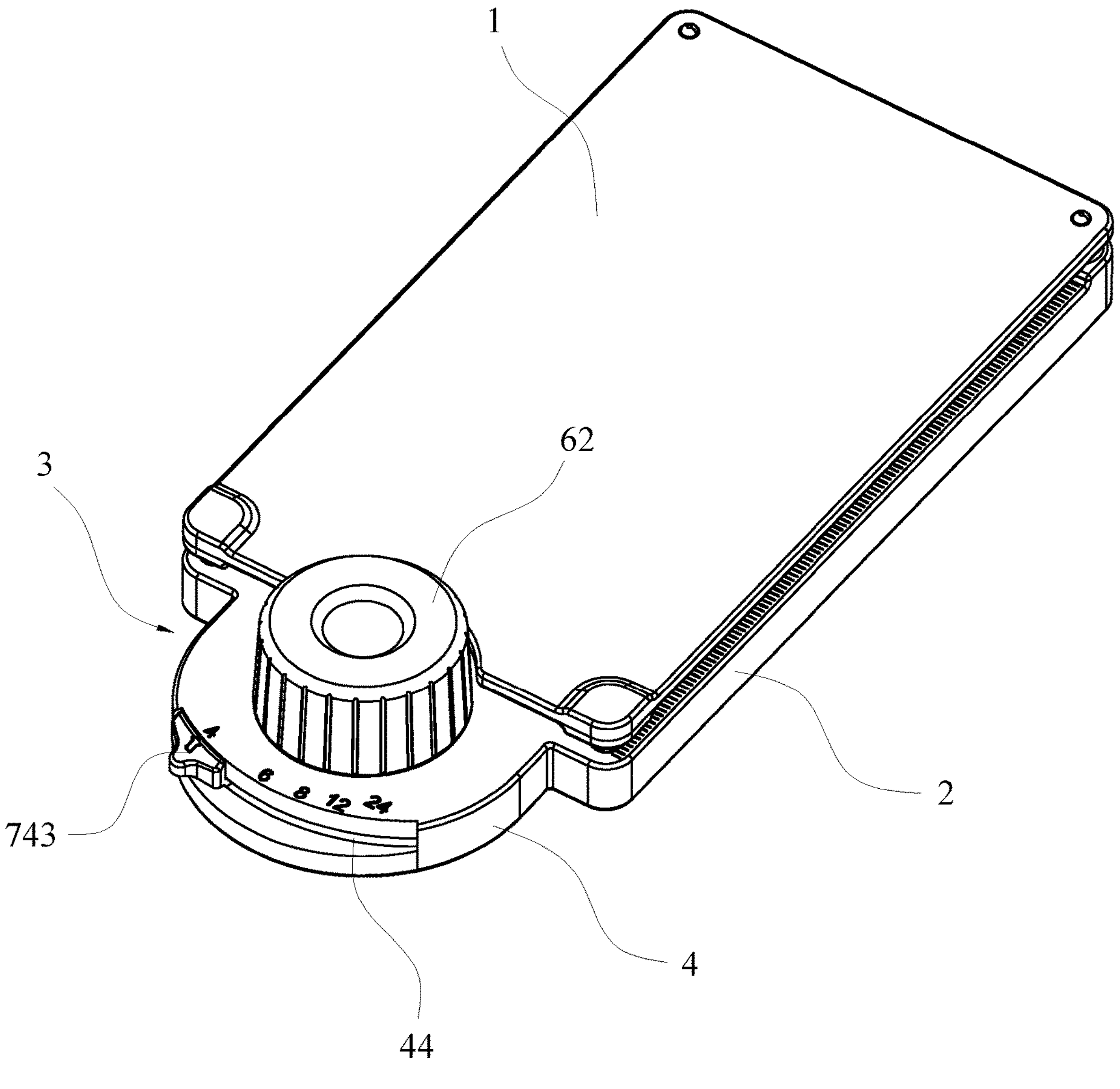
FIG. 11 is a perspective view of a stamping machine according to Embodiment 3 of the present invention.
Figure 12:
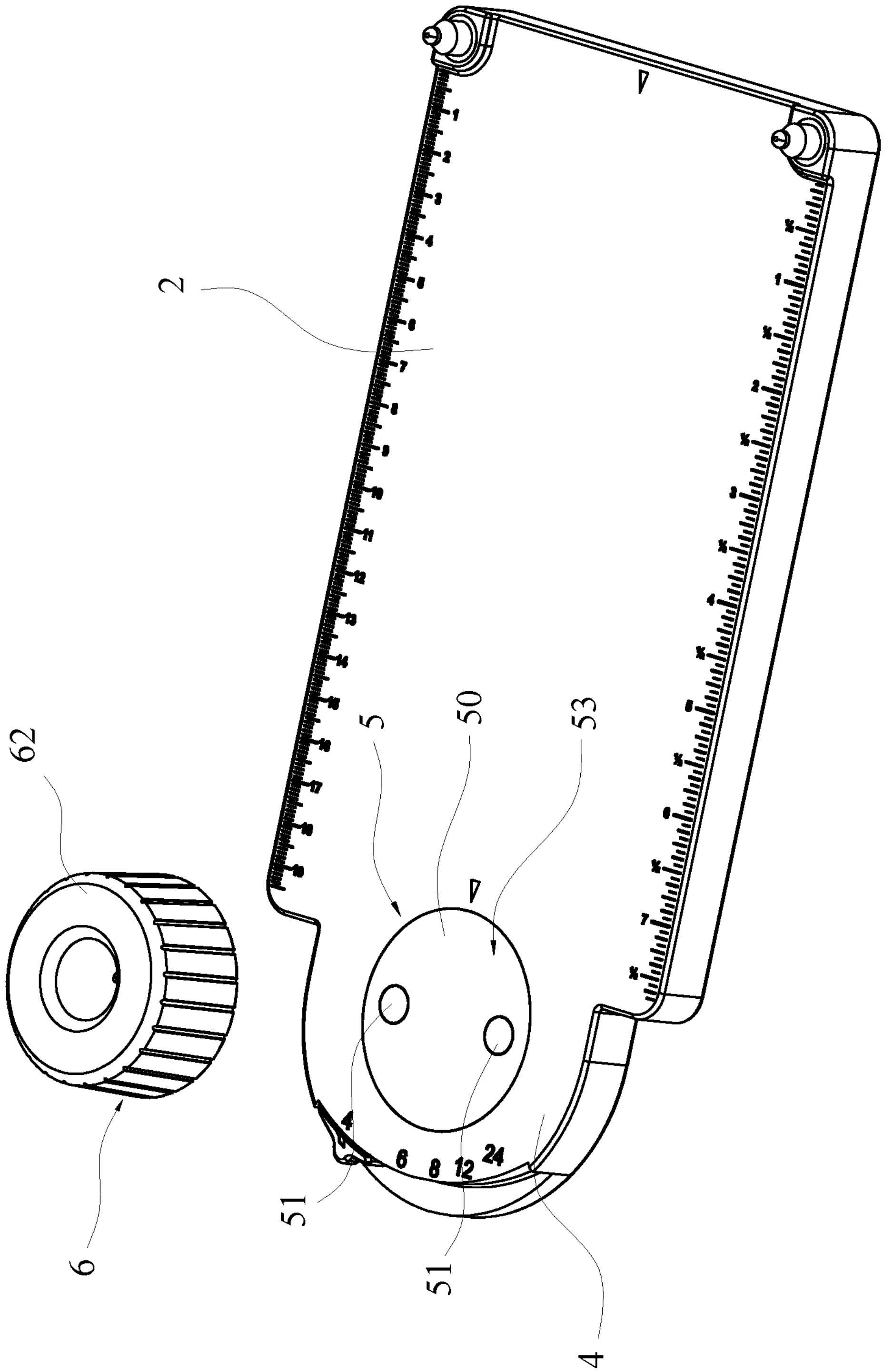
FIG. 12 is a partially exploded view of a soleplate according to Embodiment 3 of the present invention.
Figure 13:
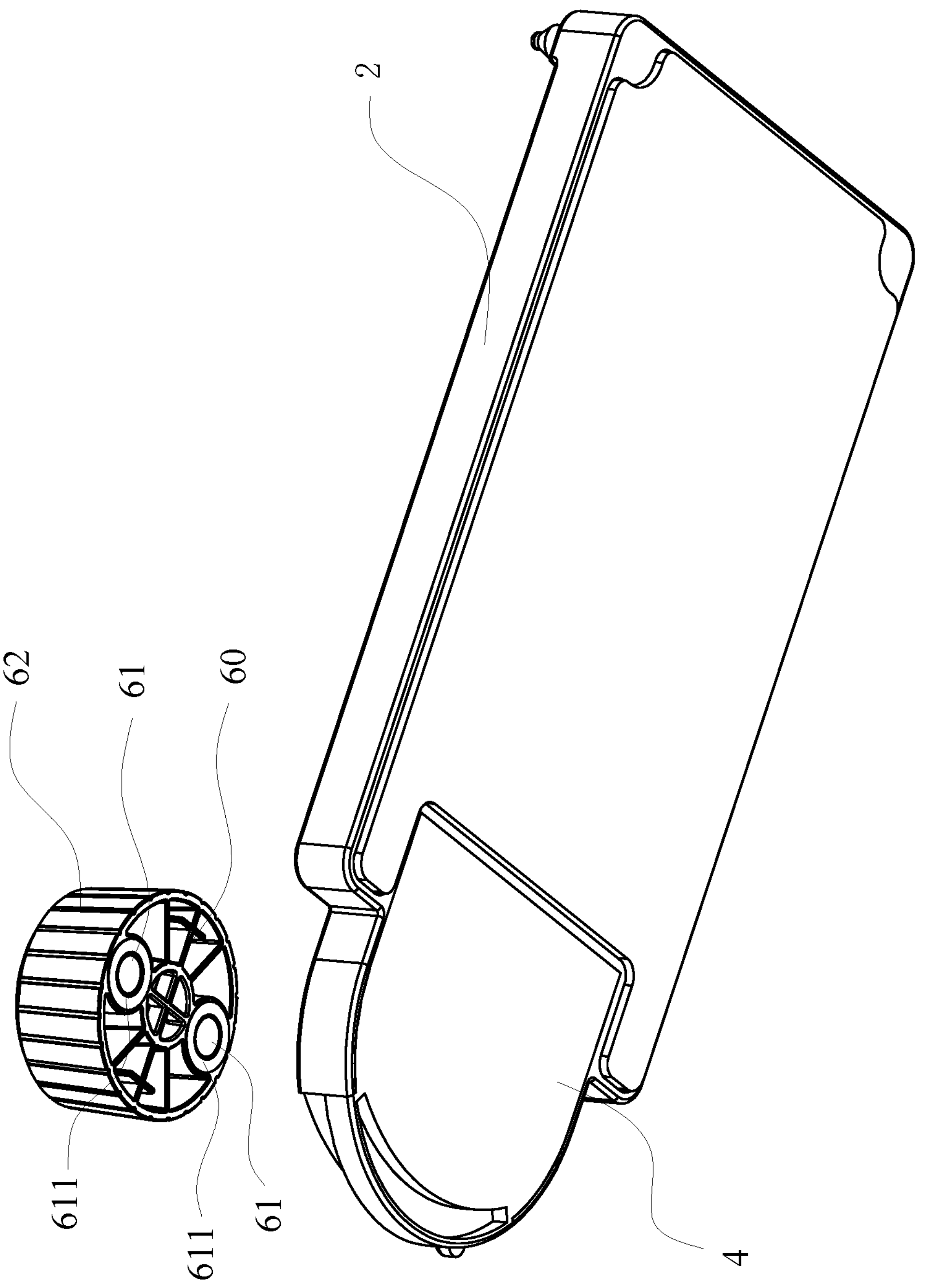
FIG. 13 is another perspective view of the FIG. 12.
Figure 14:
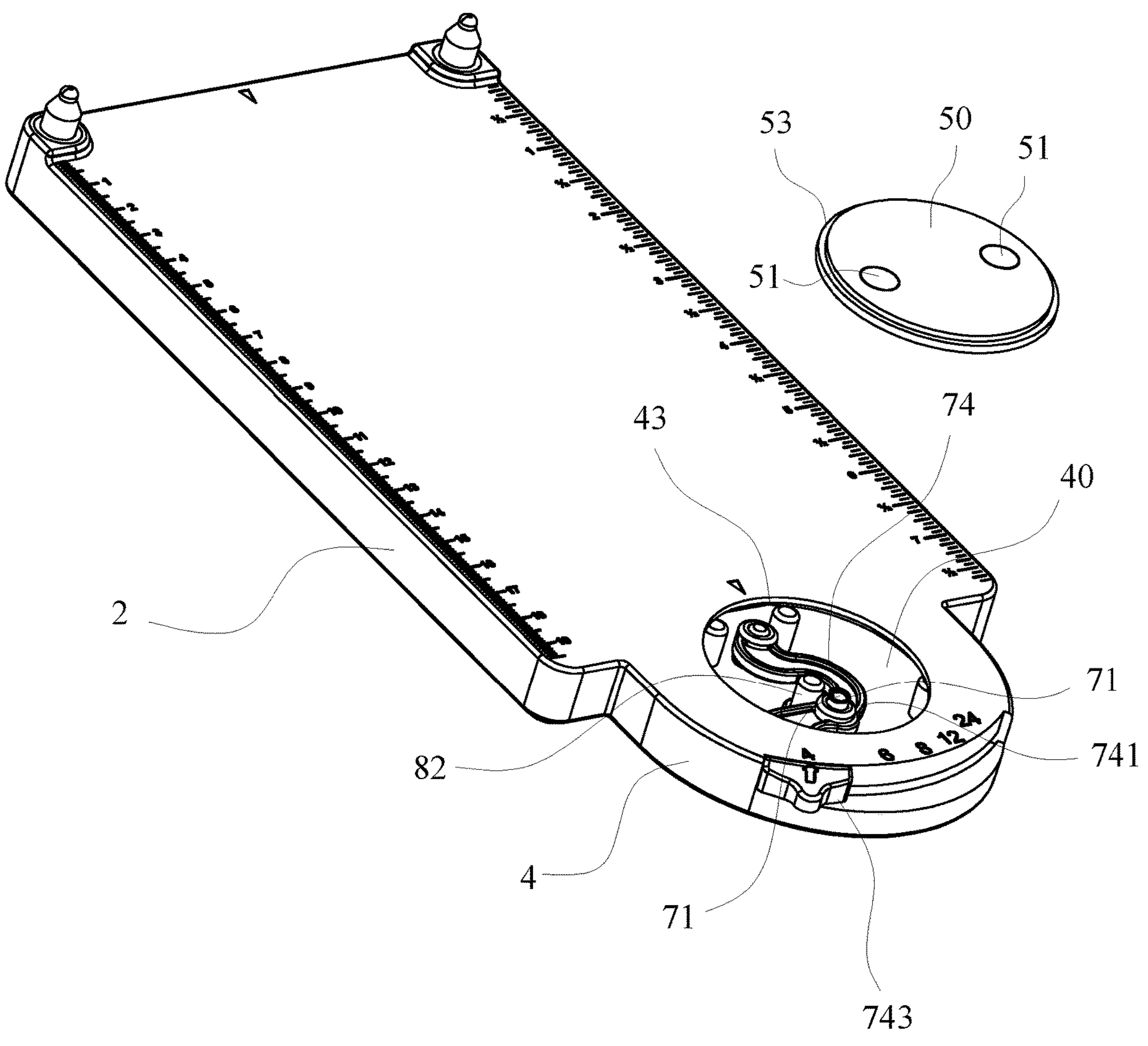
FIG. 14 is another partially exploded view of the soleplate according to Embodiment 3 of the present invention.
Figure 15:
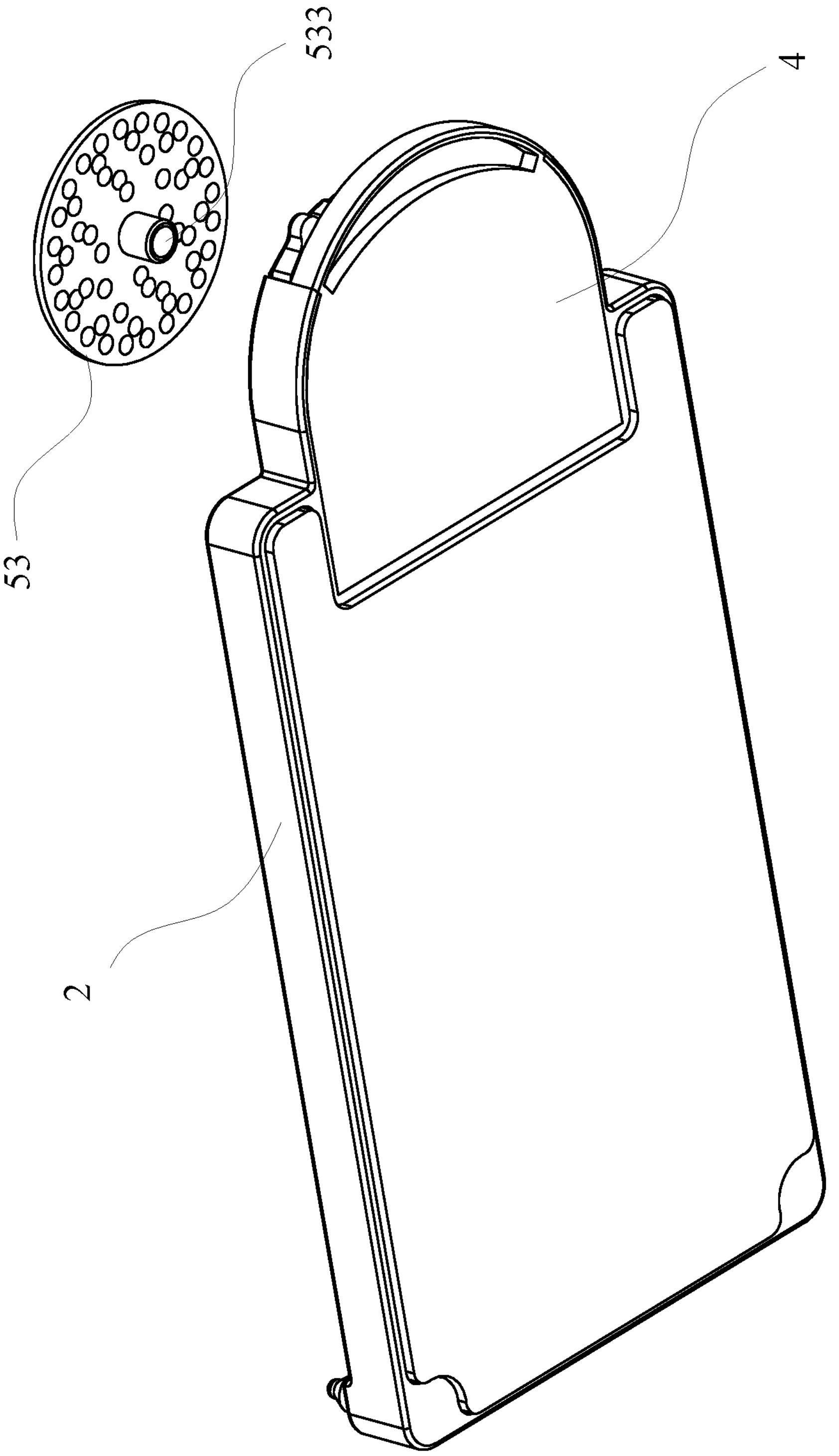
FIG. 15 is another perspective view of the FIG. 14.
Figure 16:
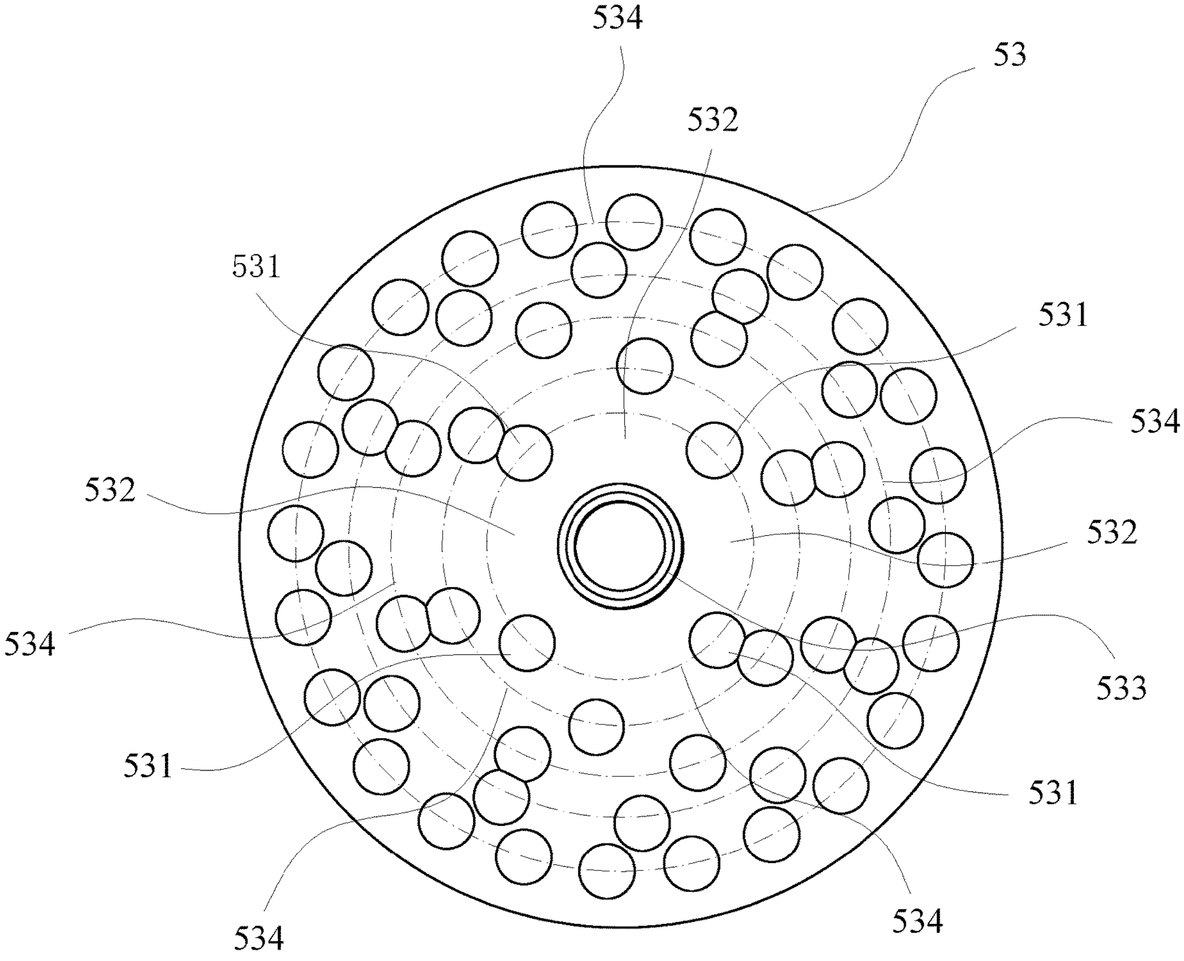
FIG. 16 is a perspective view of a rotating tray according to Embodiment 3 of the present invention.
Figure 17:
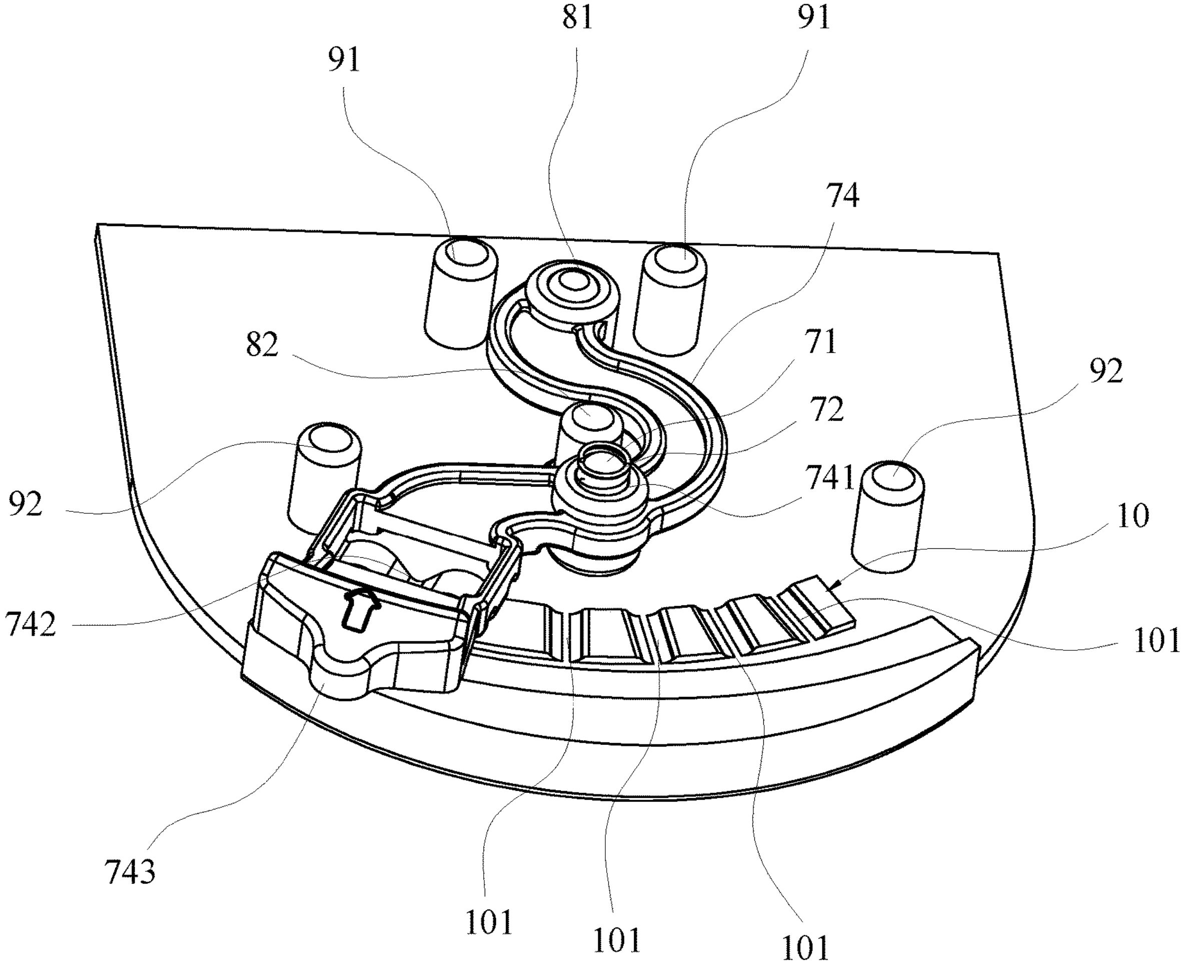
FIG. 17 is a perspective view of a part of a base according to Embodiment 1 of the present invention.
Figure 18:
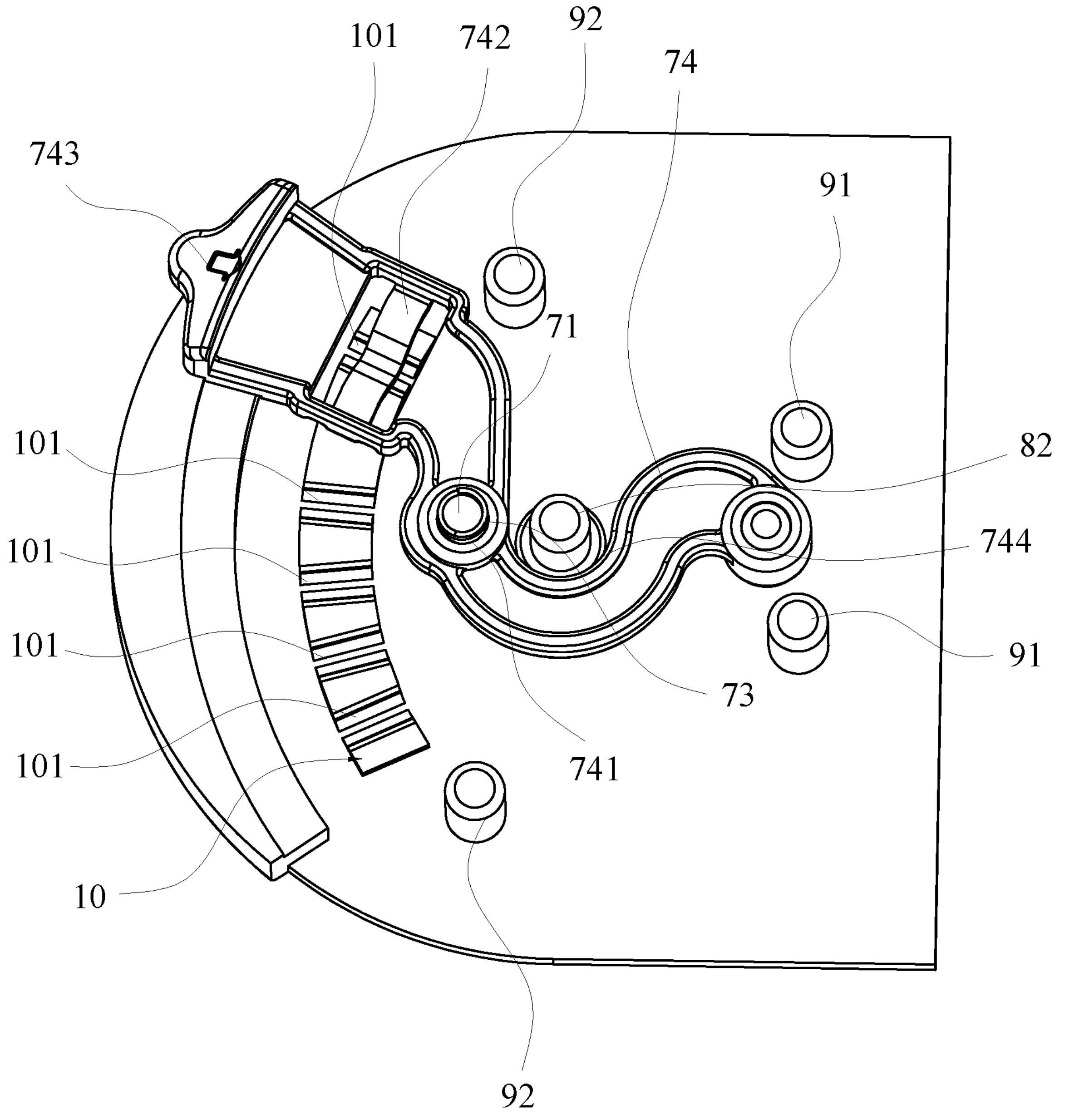
FIG. 18 is another perspective view of the FIG. 17.

FIGS. 9-10 show a second embodiment of the stamping machine. Compared with Embodiment 1, the stamping machine of this embodiment has the difference that, in this embodiment, the rotary mechanism 3 is detachably connected to the soleplate 2, that is, the base 4 of the rotary mechanism 3 is detachably connected to one end of the soleplate 2. Thus, different types of soleplates 2 and cover plates 1 can be replaced as required to satisfy the stamping requirements of different patterns. Specifically, in this embodiment, a buckling bump 45 horizontally extends outward from the end of the base 4; a buckling hole 451 is formed on the buckling bump 45; a buckling recess 21 for receiving the buckling bump 45 is formed on the bottom surface of one end of the soleplate 2; and, a vertical buckling convex column 22 can be clamped into the buckling hole 451 is arranged in the buckling recess 21.

Embodiment 3

FIGS. 11-18 show a third embodiment of the stamping machine. Compared with Embodiment 1, the stamping machine of this embodiment has the difference that, in this embodiment, the base 4 comprises a circular mounting port 43, the rotating tray 53 is embedded in the circular mounting port 43 and can rotate circumferentially in the circular mounting port 43 relative to the base 4, a mounting space 40 communicated with the mounting port 43 is disposed below the rotating tray 53, the gear recesses 531 are located on the bottom surface of the rotating tray 53, the gear recesses 531 are located circumferentially at regular intervals centered on a bottom surface of the rotating tray 53 to form gear rings 534, the gear marble 71 and the gear spring 73 are both disposed in the mounting space 40, the gear marble 71 is exactly opposed to the gear rings 534, and the gear spring 73 urges the gear marble 71 toward the gear rings 534.

Furthermore, the rotation gear unit 7 further comprises a gear arm 74 horizontally arranged in the mounting space 40; a second mounting hole 741 extending vertically is formed on a top surface of the gear arm 74; the gear marble 71 is embedded into the second mounting hole 741 and can move in the depth direction of the second mounting hole 741; and, the gear spring 73 is limited between the gear marble 71 and an inner bottom face of the second mounting hole 74. The gear marble 71 moves along the gear ring 534. When the gear marble 71 is clamped into a gear groove 531, the rotating tray 53 stops rotating, and the stamp stamps a pattern on the stamping carrier. When the gear marble 71 resists against the gear teeth 532, the gear spring 73 is compressed and drives the gear marble 71 to move up. Thus, when the gear marble 71 slides into a next gear recess 531, the gear marble 71 can be clamped into this gear recess 531 under the action of the elastic force of the gear spring 73.

Furthermore, at least two concentric gear rings 534 are located on the bottom surface of the rotating tray 53, the gear recesses 531 are disposed on perimeters of the gear rings 534 at uniform intervals, the number of the gear recesses 531 on each gear ring 534 scales directly with the circumferential length of the gear ring 534, the gear arm 74 is capable of moving horizontally in the mounting space 40 to allow the gear marble 71 to vertically urge against the corresponding gear ring 534, thereby shifting gears. Thus, the gear marble 74 can face the different gear rings 534 by moving the gear arm 534, so that the included angle between adjacent repeated patterns in the stamped annular pattern can be changed. Specifically, in this embodiment, if there are five gear springs 534, there are also five adjustable gears corresponding to the gear arm 74: 4th gear (with an included angle of 90°), 6th gear (with an included angle of 60°), 8th gear (with an included angle of 45°), 12th gear (with an included angle of 30°), and 24th gear (with an included angle of 15°).

To better realize the rotation of the gear arm 74, a gear column 81 is vertically arranged in the mounting space 40; the gear arm 74 has a long strip shape, a first end of the gear arm 74 is pivoted to the gear column 81; during rotation of the gear arm 74 about the gear column 81, the gear marble 71 moves back and forth between different gear rings 534, so that the gear marble 71 can be adjusted to face the corresponding gear ring 534 as required to obtain an annular pattern with the desired included angle.

Furthermore, to limit the act of the gear arm 74 and avoid the situation where the gear marble 71 slides out the gear rings 534 during the gear shifting process and cannot slide between different gear rings 534, there are two pairs of limiting columns 91, 92 vertically disposed in the mounting space 40, the two pairs of limiting columns 91, 92 are disposed on two sides of the gear arm, respectively, when the gear arm 74 is resisted against one pair of limiting columns 91, 92, the gear marble 71 is urged against the gear ring 534 with the shortest circumference, and, when the gear arm 74 is resisted against the other pair of limiting columns 91, 92, the gear marble 71 is urged against the gear ring 534 with the longest circumference. In addition, a rotating column 82 is vertically disposed in the mounting space 40, a rotating shaft sleeve 533 vertically extending downward is disposed on a center of a bottom of the rotating tray 53, the rotating shaft sleeve 533 is connected to the rotating column 82 and can rotate around the rotating column 82, so that the rotating tray 53 can rotate more stably.

Specifically, in this embodiment, the second mounting hole 741 is disposed on a middle portion of the gear arm 74, the gear column 81 is located on one side of the rotating column 82, and the middle portion of the gear arm 74 is bent toward one side in the horizontal direction to form an avoidance groove 744 for receiving the rotating column 82; each pair of limiting columns 91, 92 has a first vertical column 91 and a second vertical column 92, the two first vertical columns 91 are disposed on two sides of the first end of the gear arm 74, respectively; and the two second vertical columns 92 are disposed on two sides of a second end of the gear arm 74, respectively. Thus, the rotation of the gear arm 74 can be better limited, the movement of the gear marble 71 between different gear rings 534 can be better limited, and the accuracy of gear shifting can be ensured.

Furthermore, a limiting ring surface 10 corresponding to a rotation trajectory of the gear arm 74 is arranged in the mounting space 40; the limiting ring surface 10 comprises a plurality of limiting grooves 101 corresponding to the gear rings 534; an elastic limiting bump 742 is convexly disposed at the second end of the gear arm 74; and, the elastic limiting bump 742 can slide long the limiting ring 10 and can be clamped into each limiting groove 101. On one hand, the gear arm 74 can be limited at the desired gear through the connection between the elastic limiting bump 742 and the corresponding limiting groove 101; on the other hand, it is convenient for the user to perform a gear shifting operation on the gear arm 74. In this embodiment, an elastic piece (e.g., a spring leaf) is arranged at the second end of the gear arm 74, and the middle portion of the elastic piece is bent downward to form the elastic limiting bump 742. The mounting space 40 is defined in various ways in the present invention. In this embodiment, the base 4 is of a hollow structure having an inner cavity which forms the mounting space 40, and the mounting port 43 is formed on a top wall of the base 4; the gear column 81, the limiting columns 91, 92 and the limiting grooves 101 are formed on an inner bottom surface of the base 4, respectively, and an operating port 44 is formed on an outer sidewall of the base 4; and, an end portion of the second end of the gear arm 74 is exposed from the operating port 44 and forms an operating end 743 for manual operation. Therefore, the inner structure of the base 4 can be simpler, and it can be more convenient for the user to perform the gear shifting.

The invention claimed is:

1. A rotating mechanism for annular pattern stamping comprising:
- a base (4);
- a rotating unit (5) rotatably disposed on the base (4), the rotating unit (5) having a first clamping plane (50) at a top thereof;
- an operating unit (6) detachably disposed on the rotating unit (5), the operating unit (6) having a second clamping plane (60) at a bottom thereof;
- wherein,
- a clamping space is defined between the rotating unit (5) and the operating unit (6) for clamping a stamping carrier;
- the first clamping plane (50) is opposed to the second clamping plane (60), and the clamping space is defined between the first clamping plane (50) and the second clamping plane (60),
- the operating unit (6) is capable of rotating together with the rotating unit (5) and the stamping carrier in the clamping space relative to the base (4);
- a plurality of first magnetic pieces (51) is embedded in the first clamping plane (50) of the rotating unit (5), and a plurality of second magnetic pieces (61) is embedded in the second clamping plane (60) of the operating unit (6), and the operating unit (6) is detachably attached to the rotating unit (5) by the magnetic attraction between the plurality of first magnetic pieces (51) and the plurality of second magnetic pieces (61).

2. The rotating mechanism of claim 1, wherein the first clamping plane (50) and the second clamping plane (60) are both circular, matched in size and exactly opposed with each other;
- the operating unit (6) and the rotating unit (5) are capable of rotating circumferentially around a central axis common to the first clamping plane (50) and the second clamping plane (60).

3. The rotating mechanism of claim 1, wherein the first clamping plane (50) has two first magnetic pieces (51), and the second clamping plane (60) has two second magnetic pieces (61) each corresponding to one of the first magnetic pieces (51), and the two first magnetic pieces (51) are opposite in magnetism, each first magnetic piece (51) is capable of connecting magnetically with the corresponding second magnetic piece (61).

4. The rotating mechanism of claim 3, wherein the two first magnetic pieces (51) are symmetrically disposed around the center of the first clamping plane (50).

5. The rotating mechanism of claim 1, wherein a plurality of antiskid pads (52) is disposed on a top of the first clamping plane (50) or a bottom of the second clamping plane (60).

6. The rotating mechanism of claim 1, wherein the operating unit (6) comprises a cylindrical operating knob (62);
- a bottom surface of the operating knob (62) is defined as the second clamping plane (60), the operating knob (62) has an observation channel (621) penetrating through the operating knob (62) along a central axis of the operating knob (62), and an alignment mechanism is disposed inside the observation channel (621).

7. The rotating mechanism of claim 6, wherein the alignment mechanism comprises a cross-shaped alignment frame (63) centered on the central axis of the operating knob (62).

8. The rotating mechanism of claim 1, further comprising a rotation gear unit (7) being capable of making the rotating unit (5) rotate circumferentially relative to the base (4) at a preset angle.

9. The rotating mechanism of claim 8, wherein the rotation gear unit (7) comprises a gear marble (71), a plurality of gear recesses (531) for receiving the gear marble (71) and a gear spring (73);
- the rotating unit (5) comprises a disc-shaped rotating tray (53) and a gear ring surface (530) centered on a central axis of the rotating tray (53);
- the plurality of gear recesses (531) are distributed on the gear ring surface (530) at regular intervals, and the position between two adjacent gear recesses (531) on the gear ring surface (530) forms a plurality of gear teeth (532);
- when the operating unit (6) rotates, the gear marble (71) is driven to slide circumferentially relative to the gear ring surface (530), and when the gear marble (71) slides into one of the gear recesses (531) on the gear ring surface (530), the gear marble (71) is clamped inside the gear recess (531) by the gear spring (73).

10. The rotating mechanism of claim 9, wherein the base (4) has a circular mounting recess (41), the rotating tray (53) is located inside the mounting recess (41) and is rotatable circumferentially relative to the base (4);
- the gear ring surface (530) is located on the periphery of the rotating tray (53), the base (4) has a first mounting tunnel (42) for receiving the gear marble (71), the first mounting hole (42) extends to the mounting recess (41) and opens toward the mounting recess (41), the gear marble (71) is located inside the first mounting tunnel (42) and is movable along the first mounting tunnel (42), the gear spring (73) is limited between the gear marble (71) and an end of the first mounting tunnel (42).

11. The rotating mechanism of claim 8, wherein the rotation gear unit (7) comprises a gear marble (71), a plurality of gear recesses (531) for allowing the gear marble (71) to be clamped therein, and a gear spring (73), the rotating unit (5) comprises a disc-shaped rotating tray (53), the gear marble (71) is disposed on the periphery of the rotating tray (53);

the base (4) comprises a circular mounting port (43), the rotating tray (53) is embedded in the circular mounting port (43) and can rotate circumferentially in the circular mounting port (43) relative to the base (4), a mounting space (40) communicated with the mounting port (43) is disposed below the rotating tray (53), the gear recesses (531) are located on the bottom surface of the rotating tray (53), the gear recesses (531) are located circumferentially at regular intervals centered on a bottom surface of the rotating tray (53) to form gear rings (534), the gear marble (71) and the gear spring (73) are both disposed in the mounting space (40), the gear marble (71) is exactly opposed to the gear rings (534), and the gear spring (73) urges the gear marble (71) toward the gear rings (534).

12. The rotating mechanism of claim 11, wherein the rotation gear unit (7) further comprises a gear arm (74) horizontally disposed in the mounting space (40), a top surface of the gear arm (74) has a second mounting hole (741) extending vertically, the gear marble (71) is embedded into the second mounting hole (741) and can move in a depth wise direction of the second mounting hole (741), the gear spring (73) is limited between the gear marble (71) and an inner bottom face of the second mounting hole (741).

13. The rotating mechanism of claim 12, wherein at least two concentric gear rings (534) are located on the bottom surface of the rotating tray (53), the gear recesses (531) are disposed on perimeters of the gear rings (534) at uniform intervals, the number of the gear recesses (531) on each gear ring (534) scales directly with the circumferential length of the gear ring (534), the gear arm (74) is capable of moving horizontally in the mounting space (40) to allow the gear marble (71) to vertically urge against the corresponding gear ring (534).

14. The rotating mechanism of claim 13, wherein a gear column (81) is vertically disposed in the mounting space (40), the gear arm (74) has a long strip shape, a first end of the gear arm (74) is pivoted to the gear column (81);

during rotation of the gear arm (74) about the gear column (81), the gear marble (71) moves back and forth between different gear rings (534).

15. The rotating mechanism of claim 14, wherein there are two pairs of limiting columns (91, 92) vertically disposed in the mounting space (40), the two pairs of limiting columns (91, 92) are disposed on two sides of the gear arm, respectively, when the gear arm (74) is resisted against one pair of limiting columns (91, 92), the gear marble (71) is urged against the gear ring (534) with the shortest circumference, and, when the gear arm (74) is resisted against the other pair of limiting columns (91, 92), the gear marble (71) is urged against the gear ring (534) with the longest circumference.

16. The rotating mechanism of claim 15, wherein a rotating column (82) is vertically disposed in the mounting space (40), a rotating shaft sleeve (533) vertically extending downward is disposed on a center of a bottom of the rotating tray (53), the rotating shaft sleeve (533) is connected to the rotating column (82) and can rotate around the rotating column (82).

17. The rotating mechanism of claim 16, wherein the second mounting hole (741) is disposed on a middle portion of the gear arm (74), the gear column (81) is located on one side of the rotating column (82), and the middle portion of the gear arm (74) is bent toward one side in the horizontal direction to form an avoidance groove (744) for allowing the rotating column (82) to clamped therein;

each pair of limiting columns (91, 92) has a first vertical column (91) and a second vertical column (92), the two first vertical columns (91) are disposed on two sides of the first end of the gear arm (74), respectively; and the two second vertical columns (92) are disposed on two sides of a second end of the gear arm (74), respectively.

18. The rotating mechanism of claim 17, wherein a limiting ring surface (10) corresponding to a rotation trajectory of the gear arm (74) is disposed in the mounting space (40), the limiting ring surface (10) comprises a plurality of limiting grooves (101) corresponding to the gear rings (534), an elastic limiting bump (742) is convexly disposed at the second end of the gear arm (74), and the elastic limiting bump (742) can slide long the limiting ring surface (10) and can be clamped into each limiting groove (101).

19. The rotating mechanism of claim 18, wherein the base (4) is of a hollow structure having an inner cavity which forms the mounting space (40), and the mounting port (43) is formed on a top wall of the base (4);

the gear column (81), the limiting columns (91, 92) and the limiting grooves (101) are disposed on an inner bottom surface of the base (4), respectively, and an operating port (44) is formed on an outer sidewall of the base (4), an end portion of the second end of the gear arm (74) is exposed from the operating port (44) and forms an operating end (743) for manual operation.

20. A stamping machine comprising a soleplate (2) and a cover (1) disposed on the soleplate (2); wherein the stamping machine has the rotating mechanism for annular pattern stamping of claim 1.

21. The stamping machine of claim 20, wherein the rotating mechanism is integrated with or detachably connected to the soleplate (2).

* * * * *